United States Patent
Steckl et al.

(10) Patent No.: US 7,123,796 B2
(45) Date of Patent: Oct. 17, 2006

(54) LIGHT EMISSIVE DISPLAY BASED ON LIGHTWAVE COUPLING

(75) Inventors: Andrew J. Steckl, Cincinnati, OH (US); Jason C. Heikenfeld, New Richmond, OH (US)

(73) Assignee: University of Cincinnati, Cincinnati, OH (US)

(*) Notice: Subject to any disclaimer, the term of this patent is extended or adjusted under 35 U.S.C. 154(b) by 207 days.

(21) Appl. No.: 10/730,332

(22) Filed: Dec. 8, 2003

(65) Prior Publication Data
US 2005/0123243 A1 Jun. 9, 2005

(51) Int. Cl.
G02B 6/26 (2006.01)
F21V 9/16 (2006.01)
F21V 7/04 (2006.01)

(52) U.S. Cl. .......................... 385/40; 385/39; 385/900; 362/84; 362/601; 362/606

(58) Field of Classification Search .................. 385/15, 385/39, 40, 141, 147, 900; 362/84, 601, 362/606, 618
See application file for complete search history.

(56) References Cited

U.S. PATENT DOCUMENTS

| | | | | |
|---|---|---|---|---|
| 4,147,932 A | 4/1979 | Lewis | | 250/330 |
| 4,822,145 A | 4/1989 | Staelin | | 350/345 |
| 4,909,611 A | 3/1990 | Spooner | | 350/360 |
| 5,294,870 A | 3/1994 | Tang et al. | | 313/504 |
| 5,771,321 A | 6/1998 | Stern | | 385/31 |
| 5,898,185 A | 4/1999 | Bojarczuk, Jr. et al. | | 257/103 |
| 5,986,796 A | 11/1999 | Miles | | 359/260 |
| 5,994,722 A | 11/1999 | Averbeck et al. | | 257/89 |
| 6,208,791 B1 | 3/2001 | Bischel et al. | | 385/129 |
| 6,407,851 B1 | 6/2002 | Islam et al. | | 359/291 |
| 6,574,033 B1 | 6/2003 | Chui et al. | | 359/291 |
| 6,589,625 B1 | 7/2003 | Kothari et al. | | 428/46 |
| 6,635,306 B1 | 10/2003 | Steckl et al. | | 427/66 |
| 6,642,913 B1 | 11/2003 | Kimura et al. | | 345/84 |
| 6,819,845 B1 * | 11/2004 | Lee et al. | | 385/122 |
| 6,961,167 B1 | 11/2005 | Prins et al. | | |
| 6,967,763 B1 | 11/2005 | Fujii et al. | | |

FOREIGN PATENT DOCUMENTS

| | | |
|---|---|---|
| GB | 2 404 448 | 2/2005 |
| JP | 2000-214804 | 8/2000 |

(Continued)

OTHER PUBLICATIONS

J.L. Jackel, S. Hackwood and G. Beni, *Electrowetting Optical Switch*, Appl. Phys. Lett. 40(1), Jan. 1, 1982 (3 pages).

(Continued)

*Primary Examiner*—Frank G. Font
*Assistant Examiner*—Michael P. Mooney
(74) *Attorney, Agent, or Firm*—Wood, Herron & Evans, L.L.P.

(57) ABSTRACT

A light emissive display having a specular waveguide that propagates short wavelength light and photoluminescent features adjacent to the waveguide that fluoresce, for example, in visible red, green, blue, and mixed colors when selectively coupled with the short wavelength light. The photoluminescent layers emit light primarily and, therefore, efficiently in the direction of an observer only. This light emissive display may be utilized as a planar light source, as patterned information signage, or as a re-configurable information display containing intensity modulated pixels. The light emissive display may be enhanced optically such that only a small portion of ambient light is reflected from the display while preserving the majority of emitted display luminance.

12 Claims, 5 Drawing Sheets

FOREIGN PATENT DOCUMENTS

WO  WO 97/31288  8/1997
WO  WO 98/19201  5/1998

OTHER PUBLICATIONS

Xiaohua Ma, and Geng-Sheng (G.S.) Kuo, *Optical Switching Technology Comparison: Optical MEMS vs. Other Technologies*, IEEE Optical Communications, Nov. 2003, pp. S16-S23.

M.G. Pollack, A.D. Shenderov and R.B. Fair, *Electrowetting-based actuation of droplets for integrated microfluidics*, Lap Chip Journal, 2002, 2, pp. 96-101.

European Patent Office, Partial International Search Report in Corresponding PCT Application No. PCT/US2004/040819 (2 pages).

\* cited by examiner

LIGHT EMISSIVE DISPLAY BASED ON LIGHTWAVE COUPLING

FIELD OF THE INVENTION

The invention relates to light emissive devices and, more specifically, to light emissive devices having improved efficiency and robustness.

BACKGROUND OF THE INVENTION

Many technologies are currently being developed to provide the next generation of flat panel, projection, flexible, and micro-displays. Flat-panel emissive displays, which emit light in a lambertian behavior, are considered by consumers to be the most attractive display. Despite the human eyes natural affinity for emissive displays, liquid crystal displays (LCD) currently dominate the commercial display market. Because LCD's filter white light, which passes through polarizers, a perceptible variance in image quality is observed with view angle. Furthermore, the vast majority (approximately 90 percent or greater) of light in a LCD never reaches the viewer because of unavoidable absorption in thin film polarizers and color filters, and other optical losses in the LCD. Generally, polarizers transmit only about 40 percent of unpolarized incident light and color filters transmit only about 20 percent to about 30 percent of incident white light.

Cold cathode fluorescent lamp (CCFL) backlights, which provide about 80 lm/W efficiency, generally result in an LCD efficiency of only a few lm/W.

Furthermore, the LCD continuously absorbs light at a pixel regardless of whether the pixel is on (i.e., transmissive) or off (i.e., not transmissive). This insensitivity to pixel state leads to very poor panel efficiency for displaying images that utilize only a fraction of the overall number of LCD pixels. Alternative flat panel display technologies, such as inorganic electroluminescent, organic electroluminescent, plasma display panels, and field emission displays, do not require either efficiency-reducing polarizers or heavy color filtering. Regardless, even these alternative display technologies have comparable or lower efficiency to that of an LCD display panel.

The elimination of polarizers and color filters would significantly improve the efficiency of LCD's. Previous attempts to remove the polarizers from an LCD have included using focal conic domains to scatter light from a specular waveguide and replacing the inefficient liquid crystal cell with electromechanical light valves that involve a specular white light guides, diffuse light outcoupling, and heavy color filtering. Such conventional approaches provide only moderate, if any, efficiency improvements over conventional LCD's and suffer from significant inherent drawbacks, such as strong diffuse reflectivity of ambient light and poor contrast between pixel on and pixel off states.

Therefore, what is needed is a light emissive display that can use a highly efficient lamp or light emitting diode (LED) and that does not require either polarizers or color filtering of white light.

SUMMARY OF THE INVENTION

In accordance with the principles of the invention, a specular waveguide propagating relatively short wavelength ultraviolet, violet, or blue light may be equipped with a coupling element capable of selectively coupling the short wavelength light to a photoluminescent medium adjacent to the waveguide. Unlike conventional approaches, the background luminance arising from imperfections in such waveguides is extremely low, as the human eye perceives ultraviolet and violet light with a low brightness. Upon receiving the relatively short wavelength light, the photoluminescent medium fluoresces in visible red, green, blue, and mixed colors. Furthermore, the photoluminescent medium may be designed to emit light primarily and efficiently in the direction of the viewer only achieving greater than about 50 percent light outcoupling, which significantly exceeds conventional approaches that are generally limited to less than 15 percent light outcoupling. The devices of the invention may be utilized as a planar light source, patterned information signage, or a re-configurable information display containing intensity-modulated pixels. The devices of the invention may be adapted to provide contrast enhancement that supplies legibility in bright lighting environments without a large concomitant loss in emitted luminance.

According to the principles of the invention, a specular waveguide propagates short wavelength light confined to the waveguide via internal reflection. The short wavelength light is coupled to a photoluminescent medium by modifying the index of refraction at the interface between the waveguide and the photoluminescent layer such that short wavelength light is optically transmitted or refracted into the photoluminescent medium. The index of refraction between the photoluminescent medium and waveguide is modulated by electro-static, electro-optic, electro-wetting, or another suitably controllable actuation technique. The photoluminescent medium fluoresces and emits light isotropically consistent with spontaneous emission theory. Through optical refraction or reflection, fluorescent light is confined to the photoluminescent medium until it is emitted onto the viewer.

The light emissive display technology of the invention uses a highly efficient lamp or LED technology and requires no polarizers or color filtering of white light. Furthermore, a light emissive display is provided that is inherently lambertian, or emissive, in nature such that the pixels are efficient in outcoupling of emission to a viewer and are not strongly diffusely reflective. Furthermore, if a specular waveguide technique is used, the waveguide propagates light that is invisible (ultraviolet) or of low brightness (violet, blue) to the human eye, for the purpose of reducing the background luminance of such a type of display.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Although the invention will be described next in connection with certain embodiments, the description of the invention is intended to cover all alternatives, modifications, and equivalent arrangements as may be included within the spirit and scope of the invention as defined by the appended claims. In particular, those skilled in the art will recognize that the components of the modulated lightwave coupling devices and displays described herein could be arranged in multiple different ways.

Figure 1:
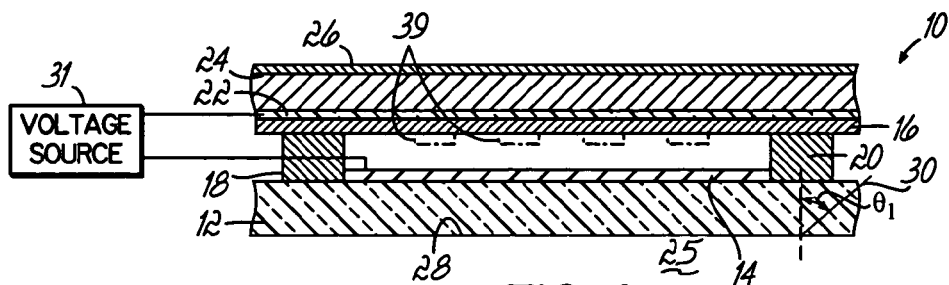
FIG. 1 is a cross-sectional view of an electrostatically modulated lightwave coupling device of the invention depicted in a non-emitting state.
Figure 3A:
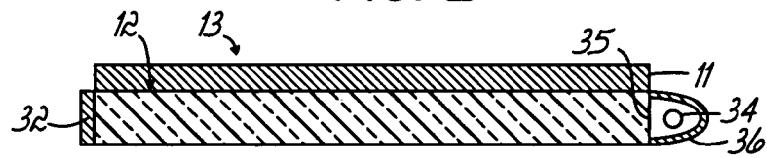
FIG. 3A is a cross-sectional view of a waveguide and a short wavelength light source in accordance with embodiments of the invention.

With reference to FIG. 1, a lightwave coupling (LWC) device 10 comprises one of an array 11 of multiple substantially identical LWC devices 10 constituting a lightwave coupled (LWC) display 13 (FIG. 3A). The LWC devices 10 are coupled with a waveguide 12, of which only a portion is shown in FIG. 1, that operates as a supporting substrate. Each of the LWC devices 10 includes a lower electrode 14, a flexible supporting layer or membrane 16 physically separated from the waveguide 12 by spacers 18, 20 when device 10 is in a non-emitting state, and an upper transparent electrode 22 covered by a photoluminescent medium or layer 24. Waveguide 12 is any optically transparent material capable of propagating ultra-violet, violet, or blue light and having a refractive index higher than the refractive index of an environment 25 surrounding the LWC device 10. A surrounding environment 25 of gas or vacuum has a refractive index of about 1.0 and a surrounding environment of a low index liquid, such as water or other optical fluids, typically have refractive indices of about 1.3 to about 1.4. Suitable materials for constructing waveguide 12 include, but are not limited to, silicon nitride ($Si_3N_4$), silicon oxynitride (SiON), borosilicate glass, aluminosilicate glass, float glass, and other optical glasses and polymers known by those skilled in the art of optics. Particularly suitable materials for waveguide 12 include organic polymethyl methacrylate (PMMA) and inorganic silicon dioxide (glass), each of which has a refractive index of about 1.5 at visible light wavelengths.

Because of the refractive index difference with the surrounding environment, light, diagrammatically indicated on FIG. 1 by reference numeral 30, can propagate indefinitely within the waveguide 12 as long as it propagates within an incident angle $\theta_1$ relative to internal surfaces 28 of waveguide 12 within the critical angle for internal reflection. The minimum incident angle, commonly called the critical angle, is calculated according to Snell's law of refraction for the case of the transmitted angle $\theta_2$ equal to 90°:

$$n_1 \sin \theta_1 = n_2 \sin \theta_2 \qquad (1)$$

For example, if the waveguide 12 is composed of PMMA, the critical incident angle may be calculated to be 42° at one of the internal surfaces 28 if the surrounding environment 25 is either gas or vacuum (i.e., $n_2=1$). Efficient internal reflection requires that the internal surfaces 28 be specular and substantially free of light scattering imperfections. Higher or lower refractive index waveguide materials will decrease or increase the critical angle, respectively.

The thickness of the waveguide 12 will affect the optical power density at any given point in waveguide 12. The thickness of waveguide 12 may be about 1 mm to about 10 mm thick for a rigid display and on the order of 0.01 mm to 2 mm thick for a flexible display. A flexible display further requires that all other films and substrates used in fabrication of the display device be inherently flexible, or suitably thin such that they become flexible. The invention contemplates that multiple LWC devices 10 are integrated in an addressable display incorporating multiple pixels arranged in an array.

References herein to terms such as "vertical", "horizontal", etc. are made by way of example, and not by way of limitation, to establish a frame of reference. The term "horizontal" as used herein is defined as a plane parallel to the conventional plane or surface of the waveguide associated with the display, regardless of orientation. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood various other frames of reference may be employed without departing from the spirit and scope of the invention. As used herein, the term "lower layer(s)" refers to stationary components of the display, such as the waveguide, and the term "upper layer(s)" refers to portions of the LWC device that move relative to the lower layers when actuated.

With continued reference to FIG. 1, the lower electrode 14 may be reflective, transparent, or have patterned apertures allowing for partial transparency. A transparent lower electrode 14 may be an inherently optically-transparent and electrically-conductive material, or a layer comprising a non-transparent or partially transparent electrically-conductive material with patterned apertures, or open spaces, or extreme thinness in order to provide for adequate transparency, or a combination thereof. Suitable transparent lower electrodes 14 may have a thickness in a range of about 0.01 μm to about 1 μm, although the invention is not so limited. An inherently optically transparent lower electrode 14 ideally has a refractive index close to the refractive index of the waveguide 12 such that it also contributes to light propagation in the waveguide 12 by internal reflection. Suitable inherently transparent materials for lower electrode 14 include, but are not limited, to indium tin oxide (ITO or $In_2O_3:SnO_2$), ZnO:Al, PEDT/PSS polymer, and polyanaline polymer. Non-transparent patterned materials for lower electrode 14 should be highly reflective to short wavelength light.

Suitable metals or semiconductors for the construction of lower electrode 14 when either thinned or patterned include, but are not limited to, aluminum (Al), silver (Ag), platinum (Pt), chromium (Cr), and any electrically-doped narrow band-gap semiconductor such as silicon (Si) or germanium (Ge). Because narrow band-gap semiconductors are light absorbing, the lower electrode 14 may further include a reflective element (not shown) between the waveguide 12 and lower electrode 14. The lower electrode 14 may be a composite structure of an inherently transparent electrode layer, such as ITO, and a non-transparent reflective metal electrode layer, such as Al, in order to provide both high transparency, supplied by ITO, and high electrical conductivity, supplied by Al.

With continued reference to FIG. 1, the flexible membrane 16 is suspended above the waveguide 12 and, as described above, physically separated from the waveguide 12 by spacers 18, 20. The peripheral edges of the flexible membrane 16 are captured between the spacers 18, 20 and the upper electrode 22 such that the peripheral edges are stationary as the LWC device 10 is cycled between on and off states. In certain embodiments, the separation distance is within the range, but not limited to, about 0.01 µm to about 100 µm. In other embodiments, the separation distance is in the range of about 1 µm to 10 µm. A suitable thickness for flexible membrane 16 is within the range, but not limited to, about 0.01 µm to about 100 µm. The flexible membrane 16 is constructed of any flexible membrane material that tolerates flexing without loss of elasticity or resultant physical degradation. In certain embodiments, the flexible membrane 16 should be able to withstand multiple flexing that, for a 20,000 hr display lifetime operated at 60 Hz, requires as much as several billion actuations without experiencing mechanical failure. In an alternate embodiment, the flexible membrane 16 may be omitted from the LWC device 10 if the photoluminescent layer 24 and/or upper electrode layer 22 provide suitable flexibility.

The flexible membrane 16 may be composed of a highly resilient and transparent material, or combination of materials, for which suitable materials include, but are not limited to, silicon oxide ($SiO_2$), $Si_3N_4$, and combinations or compounds of these materials. Optically opaque materials, such as polysilicon and other semiconductors, and steel, inconel, and other metals, may also be used for the flexible membrane 16 but must be appropriately patterned such that the path of light between the waveguide 12 and photoluminescent layer 24 is not occluded or hindered. Polymers also exhibit flexibility and transparency and, hence, may also be utilized for the construction of flexible membrane 16 as long as they are mechanically resilient.

The spacers 18, 20 should not absorb light from the waveguide 12 and therefore preferably have a lower reflective surface, alternatively are inherently reflective, or alternatively are transparent and consist of an upper reflective surface. If the spacers 18, 20 contact very little surface area of the waveguide they need not necessarily be highly reflective since very little of the waveguide light will be incident on and absorbed by the spacers 18, 20. Suitable materials for support spacer 18, 20 include, but are not limited to, polysilicon, $SiO_2$, or $Si_3N_4$ with Ag mirrored confronting surfaces, or titanium (Ti) or platinum (Pt) spacers. Suitable supporting dimensions for spacers 18, 20 include height of 0.1 to 100 µm and width and/or length of 0.1 to 1000 µm. Spacers 18, 20 can be formed in various geometries, include pillars, ridges, grids, and other geometries familiar to persons of ordinary skill in the art of micro-electromechanical actuators, such that they lend adequate support to the flexible membrane 16.

With continued reference to FIG. 1, the upper electrode 22, which may be composed of the same materials as lower electrode 14 and is transparent, is coextensive with an upper surface of the flexible membrane 16. The photoluminescent material of the photoluminescent layer 24 covering the upper electrode 22 fluoresces longer wavelength light, such as visible light, upon receipt of shorter wavelength, such as ultraviolet, violet, or blue light. The photoluminescent layer 24 is flexible, optically transparent, and about 0.01 µm to about 100 µm in thickness. The photoluminescent layer 24 may uniformly overlie the entire upper surface of the flexible membrane layer 16 or, preferably, overlie only a center portion of the flexible membrane 16 so that the edges of the flexible membrane 16 may flex freely near the spacers 18, 20 and to prevent unwanted pixel blooming. The photoluminescent layer 24 may also be patterned in island, lens, ridge, grating, textured, or other geometries for high light outcoupling efficiency known by those skilled in the art of emissive displays and optics.

Suitable materials forming for the photoluminescent layer 24 include perylene, coumarin, and other commons fluorescent dyes, such as laser dyes, dispersed in a polymer host. Among the suitable materials are BASF Lumogen™ dyes dispersed in a polymethylmethacrylate (PMMA) matrix. Example dyes for red, green, and blue emission are Lumogen™ 300, Lumogen™ 083, and Lumogen™ 570, respectively. Suitable materials also include BASF Lumogen™ dyes in a high refractive index (n greater than about 1.5) polymer such as Brewer Science OptiNDEX A07. Suitable materials also include perylene, coumarin, or other commons laser dyes, doped into a polyvinylchloride (PVC) or polyvinyl butryal (PVB) matrix. Suitable materials also include dye or phosphor powder-doped materials such as DuPont TEFLON® AF fluoropolymer that has a refractive index of about 1.3.

In alternative embodiments, the photoluminescent layer 24 may comprise an inorganic powder phosphor including, but are not limited to, BaAlO:Eu for blue light emission, SrGaS:Eu for green light emission, and $Y_2O_3$:Eu for red emission, dispersed within an organic binder, such as PMMA. In other alternate embodiments, the photoluminescent layer 24 may comprise a semiconductor including but not limited to InGaN and ZnSeS, that strongly absorbs light of greater energy than the semiconductor band-gap and re-emits light of energy comparable to the semiconductor band-gap. The photoluminescent layer 24 may also consist of two or more mixed fluorescent materials that may result in mixed colors. Multiple fluorescent materials may be used in a fashion where a first fluorescent material most efficiently absorbs light from the waveguide, fluoresces a longer first wavelength of light, and a second fluorescent material most efficiently absorbs this first wavelength of light and then fluoresces a longer second wavelength of light. Regardless of the choice of fluorescent material, the material forming the photoluminescent layer 24 may be formed in sub-micron geometries, such as nanocrystals, or in photonic band-gap structures, which can increase the color purity of the light emitted from the photoluminescent layer 24.

With continued reference to FIG. 1, the upper and lower surfaces of the photoluminescent layer 24 may each be either specular or textured. In certain embodiments of the invention, a transparent scattering layer 26 may be provided on the upper surface of the photoluminescent layer 24. The scattering layer 26 may also be a partially diffuse portion of the photoluminescent layer 24 supplied by a non-planar surface having a root-mean-square (RMS) surface roughness in the range of about 0.1 µm to about 10 µm. Alternatively, the scattering layer 26 may be made diffuse by the presence of scattering centers. For the case of a scattering layer 26 formed of a PMMA-based (refractive index of about 1.5) matrix, one suitable scattering center would be a high refractive index zinc sulfide (ZnS), barium sulfide (BaS), or titanium dioxide ($TiO_2$) powder. The scattering layer 26 may also be formed by incorporation of gas bubbles within the photoluminescent layer 24. The photoluminescent layer 24 may optionally include a layer (not shown) on its upper and/or lower surface comprising a multi-layer step index film or an optical microcavity operative for enhancing both outcoupling efficiency and color purity of light from the photoluminescent layer 24. Example multi-layer microcavities may be formed from alternating $SiO_2/TiO_2$ layers, or other formulations known by those skilled in the art of displays and optics. Enhanced outcoupling of light from the photoluminescent layer 24 using an optical microcavity does result in the disadvantage of reduced viewing angle, and is of primary use in direct-view displays and projection style displays. In an alternate embodiment of the present invention the photoluminescent layer 24 may be positioned below, and contacting the lower surface of, the flexible membrane 16.

Figure 2:
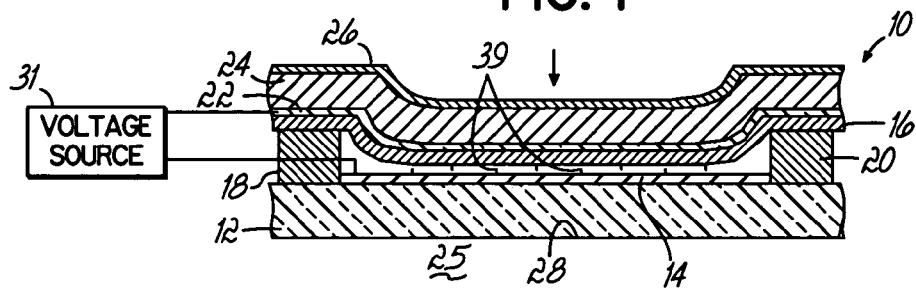
FIG. 2 is a cross-sectional view similar to FIG. 1 of the electro-statically modulated lightwave coupling device in an emitting state.

With reference to FIGS. 1 and 2, the LWC device 10 may be electrostatically addressed between an on state (FIG. 2) resulting in emission and an off state (FIG. 1) with no concomitant emission by voltage applied between lower and upper electrodes 14, 22 from an electrically-coupled voltage source 31. In the off state, the spacing between the flexible membrane 16 and the lower transparent electrode 14 and waveguide 12 prevents transfer or coupling of short wavelength light from the waveguide 12 into the flexible membrane 16 and subsequently into the photoluminescent layer 24. In the on state, the spacing is reduced or nearly eliminated by electrostatic actuation resulting from an electric field applied between the lower and upper electrodes 14, 22 precipitating an electrostatic attraction therebetween so that short wavelength light is transferred from the waveguide 12 to the photoluminescent layer 24. Typically, a voltage differential of about 1 volt to about 100 volts between the electrodes 14, 22 suffices to precipitate electrostatic actuation. In certain embodiments, the voltage differential is on the order of about 3 volts to about 5 volts, which is compatible with standard complimentary metal-oxide-silicon (CMOS) display drive circuitry.

With reference to FIG. 2, the waveguide 12 and the flexible membrane 16 have a contacting or proximate relationship when the LWC device 10 is in the on state so that short wavelength light propagating within the waveguide 12 couples into the contacting portion of the flexible membrane 16 and subsequently into the upper electrode 22 and photoluminescent layer 24. The short wavelength light is absorbed by the photoluminescent layer 24, which then fluoresces visible light. The LWC device 10 may incorporate photoluminescent layers 24 that fluoresce red, green, blue, or combinations thereof including white light. The LWC devices 10 may be arranged in individual, segmented or arrayed form to create a re-configurable monochrome, multi-color, or full-color light emissive information display or indicator.

In the on state, the upper layers constituted by flexible membrane 16, upper electrode 22 and photoluminescent layer 24 may be separated by a small separation distance or gap from the lower layers (e.g., waveguide 12 and lower electrode 14) in the on state or, alternatively, the flexible membrane 16 may be in intimate contact with the lower electrode 14. If the lower electrode 14 and the flexible membrane 16 have a contacting relationship, light couples from the lower layers to the upper layers via optical transmission, or alternatively by optical refraction if the upper layers do not match the refractive index of the lower layers. Separating the flexible membrane 16 from the lower electrode 14 by a small gap of about 0.00001 µm to about 1 µm may improve the freedom of actuation of the upper layers in and out of contact with the lower layers. The gap may be determined by the surface roughness of the contacting surfaces of the flexible membrane 16 and lower electrode 14. The gap may, alternatively, be determined by non-planar features, such as ridges, short columns, or induced surface roughness, purposely introduced to the contacting surfaces of the flexible membrane 16 and lower electrode 14. If separated by a gap, the coupling of light from the lower layers to the upper layers is believed to be determined by frustrated internal reflection according to the mathematical relationship:

$$E(z)=E_o e^{-\alpha z}, \; \alpha=2\pi n_o \lambda_0^{-1}(\sin^2\theta_i - \sin^2\theta_c)^{1/2} \qquad (2),$$

where $E(z)$ is the evanescent amplitude of light at a surface normal distance z between flexible membrane 16 and lower electrode 14.

By way of a specific illustrative example, the coefficient for penetration depth, $\alpha$, is determined to be 5.6 µm for a waveguide refractive index $n_o=1.5$, short wavelength light of wavelength $\lambda_0=0.4$ µm, incident angle of $\theta_i=45°$, and the sine of the critical angle of 1/1.5 according to equation (1). Therefore, the gap may be approximated to be 0.12 µm or 0.02 µm for 50 percent or 90 percent coupling, respectively. In alternative embodiments, an index matching fluid or other type of fluid or gel, such as silicone oil, may reside on the contacting surfaces of flexible membrane 16 and lower electrode 14, which provides a non-permanent but intimate contact between contacting layers, thus allowing as high as greater than about 99 percent coupling. The effect of frustrated internal reflection also allows for coupling of light from the waveguide 12 to the photoluminescent layer 24 in instances for which the photoluminescent layer 24 has a lower refractive index than the waveguide 12. For this case, light from the waveguide 12 only partially penetrates the photoluminescent layer 24, the penetrating light either being absorbed by the fluorescing material in the photoluminescent layer 24 or being internally reflected back into the waveguide 12.

The gap between flexible membrane 16 and lower electrode 14 in the off state should be adequately large to achieve a significant contrast ratio between the on and off states. Consistent with the predictions of equation (2), the gap between lower and upper layers should be 0.82 µm or 1.11 µm for a contrast ratio of 100:1 or 500:1, respectively. Suitable separation distances may be much greater than 1 µm and as much as 100 µm or greater.

With reference to FIGS. 1 and 2, the LWC device 10 transitions from the on state (FIG. 2) to the off state (FIG. 1) when the applied voltage differential to the electrodes 14, 22 is reduced to a level sufficient such that the flexible membrane 16 pulls itself out of contact or proximity, as is the case, with the lower electrode 14, as the upper electrode 22 moves simultaneously with the upper electrode 22, due to the action of a restoring force. The flexible membrane 16 may incorporate a residual restoring force due to a built-in constant tensile strain, or other form of strain, or due to an inherent mechanical force that opposes the electrostatic force applied between the electrodes 14, 22 and that must exceed the inherent electrostatic attraction force between the flexible membrane 16 and the lower electrode 14. The inherent restoring force provided by the constant tensile strain operates to return the flexible membrane 16 to its original un-actuated state. Alternatively, the LWC device 10 may incorporate a third electrode for pulling the membrane 16 out of contact with or proximity to, as appropriate, with waveguide 12.

A suitable actuation area for LWC device 10 is about 100 $\mu m^2$ to about $10^6$ $\mu m^2$ and is determined by the strengths of the restoring, applied electrostatic, and inherent electrostatic forces according to design theory well known by those skilled in the art of electrostatic membranes. For large LWC devices 10 having an actuation area exceeding about $10^5$ $\mu m^2$, the total device may be constituted by multiple sub-devices (e.g., one device with multiple separating spacers) having a configuration as depicted in FIGS. 1 and 2, thus allowing an increase in total device size without major change in separation distance, required applied electrostatic force, and inherent mechanical restoring force. The actuation area and/or contacting area can be but are not necessarily of equal size to the entire device area. Flexible electrostatic membrane operation is well known by those skilled in the art of microelectromechanical actuators and, according to the invention, may be configured in a variety of existing continuous or patterned membrane formats which allow for proper flexibility and restoring force in the membrane.

As described above, the volume or environment surrounding the LWC device 10 is filled with a gas, liquid, or vacuum, which allows for free movement of actuated upper layers. A preferable surrounding medium is argon (Ar) gas with a suitable pressure of about 1 mTorr to about 760 Torr and, in certain embodiments, a pressure of 1 to 100 Torr. Suitable liquid mediums can be chosen from index matching liquids and fluids well known by persons skilled in the art of optics, as long as the liquid medium has a lower refractive index than the waveguide 12 so that internal reflection of short wavelength light in the waveguide 12 is preserved.

With reference to FIGS. 1, 2 and 3A, a display 13 (FIG. 3A) would include an array of LWC devices 10 placed adjacent to a planar waveguide 12. Because the waveguide 12 is transparent and the photoluminescent layer 24 can emit light isotropically, the LWC devices 10 may be placed adjacent to either one or both sides of the waveguide 12. The shape of the waveguide 12 is limited only by the need to preserve internal reflection of light propagating in the waveguide 12. Waveguide 12 may have a planar shape or a non-planar shape, such as cylindrical. The waveguide 12 is provided with a reflector 32 on surfaces not satisfying the criterion for internal reflection. Some of such surfaces may not include a reflector 32, examples being surfaces or edge facets 35 where short wavelength light is injected into the waveguide 12 from a short wavelength light source 34, which may emit short wavelength light in a range of about 350 nm to about 450 nm. Suitable short wavelength light sources 34 include InGaN light emitting diodes, cold-cathode-lamps, or cold-cathode fluorescent lamps. Other ultraviolet, violet, blue, or even green or red, light sources are possible and are chosen from light sources known by those skilled in the art of lighting and illumination.

The choice of wavelength for the short wavelength light source 34 is a compromise between optical transparency and reflectance of materials which both decrease with decreasing wavelength of light, and increasing quantum efficiency of photoluminescent materials with decreasing wavelength and reduced background luminance of the waveguide 12 with decreasing wavelength of light. The light source 34 may comprise a coherent source, such as a laser, that may easily be aligned with most waveguide geometries for efficient injection of short wavelength light.

Most incoherent light sources 34 emit light isotropically and require assistance in coupling light into the waveguide 12. For example and as shown in FIG. 3A, a parabolic or elliptical mirror 36 may be used to efficiently inject the light from these non-coherent light sources into the waveguide 12. A parabolic mirror 36 decreases the angle incidence for light injection into the waveguide 12 and therefore also decreases Fresnel back-reflection of light at the adjacent surface of the waveguide 12. This decrease in back reflection is due to the theoretical decrease in Fresnel refection with decreasing angle of incidence. Optical lenses (not shown) may be used to improve the efficiency of light injection from the light source 34 into the waveguide. Some optical sources such as InGaN light emitting diodes are readily available in forward and side emitting lensed packages, which are well suited for injecting light into the waveguide 12.

Light traverses within the planar waveguide 12 until it is absorbed by the waveguide 12 itself, scattered at defects that may exist in waveguide 12, absorbed or scattered by layers contacting the waveguide 12, or lost due to imperfect reflection by the reflector 32. Waveguide materials such as silica glass and PMMA have a very low loss coefficient of 0.2 dB/m or 0.1 dB/m, respectively, for short wavelength light at or around 0.4 $\mu m$ wavelength. Preferable mirror materials include metals such as Ag, or multilayer dielectric mirrors comprised of $ZnS$, $TiO_2$, $SiO_2$, Ag, and other materials well known by those skilled in the art. Multi-layer dielectric mirrors such as 3M Vikuiti™ ESR film may also be used.

An additional short wavelength light sources (not shown but similar to light source 34) may be positioned on the opposing end of the waveguide 12 for increasing the coupling efficiency to the LWC devices 10 (FIG. 1) without causing significant luminance non-uniformity. In other alternative embodiments, multiple short wavelength light sources 34 may be positioned at various end locations of the three-dimensional waveguide 12.

Figure 3B:
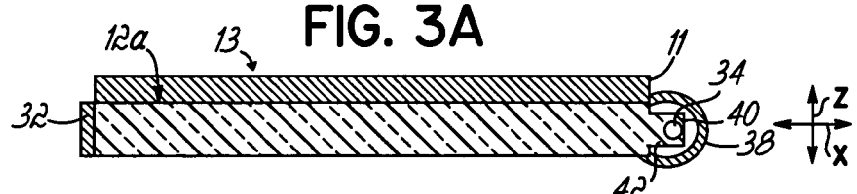
FIG. 3B is a cross-sectional view of a waveguide and short wavelength light source in accordance with an alternative embodiment of the invention.

With reference to FIG. 3B in which like reference numerals refer to like features in FIG. 3A, a planar waveguide 12a incorporates a diffuse reflector 38 used to inject the short wavelength light from the short wavelength light source 34. The diffuse reflector 38 provides a redistributive reflection of light. The length and width of waveguide 12a in the x-y direction of a Cartesian coordinate system is defined by a horizontal plane into and out of the plane of the page and the thickness of the waveguide 12a in the z (vertical) direction is normal to the plane. Reflector 38 allows light, regardless of the critical angle of waveguide 12a, to reflect back into the waveguide 12a within the critical angle, while additionally allowing a redistribution of the direction of the light traveling in the waveguide 12a. This redistribution in turn would improve luminance uniformity in the LWC display 13. In one embodiment, reflector 38 may include redistributive reflecting ridges or features oriented only in selected spatial directions. Alternatively, an efficient diffuse reflector 38 that redistributes light may also be suitable to reflect light back into the waveguide 12a as long as it is not in intimate optical contact with the waveguide 12a. According to equation (1), for the case of a waveguide refractive index of 1.5, light incident at any angle on an edge facet 40 of the planar waveguide 12a will satisfy the critical angle for propagation within the waveguide 12a. Similarly, reflector 32 (FIGS. 3A, 3B) may also be configured as a redistributive diffuse reflector similar to reflector 38.

The short wavelength source 34 may be embedded in an extruded extension 42 of the waveguide 12a, which increases the light extraction efficiency from the short wavelength source. Furthermore, by embedding the short wavelength light source 34 in the extruded extension 42 surrounded by the diffuse reflector 38, light injected into and not satisfying the critical angle requirement within the extruded portion of the waveguide 12*a* is reflected by the diffuse reflector 38 and, therefore, recycled until it satisfies the critical angle requirement. Diffuse injection and reflection of short wavelength light into the waveguide 12*a* redistributes light traveling at large angles of incidence within the waveguide 12*a* to propagation angles that are more efficiently coupled with the LWC devices 10. By way of example, if the waveguide refractive index is equal to 1.5, the edge injection or reflection of light from the waveguide end facet 40 at a maximum angle of incidence of $\theta_f=90°$ will result in a maximum angle of incidence during propagation in the waveguide of 48°. This is 6° larger than the critical angle, which reduces unwanted outcoupling of short wavelength light arising from refraction at surface irregularities or sharp bends in a flexible LWC display 13 (FIG. 3A).

A suitable diffuse reflectance material for diffuse reflector 38 is barium sulfide (BaS) powder combined with an organic binding matrix and applied to a mirrored surface of diffuse reflector 38, which will provide greater than about 99 percent diffuse reflection. Alternative techniques for supplementing injection of short-wavelength light into the waveguide 12*a* include injection of light from a source or additional waveguide containing another light source (not shown but similar to light source 34), which is optically coupled to and mounted on any surface of the waveguide 12*a*. It is further appreciated that additional light sources 34 may be embedded in the waveguide 12*a*.

To increase the propagation efficiency of short wavelength light in the waveguides 12 or 12*a*, the emission intensity can be made very uniform across the entire LWC display 13 even when a single short wavelength light source 34 is disposed to only one end of the waveguide 12 or 12*a*. This, however, requires that if the majority of the display area is populated by lightwave coupled devices 10 that are in the on state, each individual LWC device 10 itself should receive by coupling only a small fraction of the light as the light propagates past the lightwave coupled devices 10. For a 0.3 m×0.3 m PMMA waveguide 12, propagating short wavelength light will undergo 1.5 percent (e.g., 0.06 dB) absorption loss for each traverse across the panel, 2 percent (e.g., 0.09 dB) loss at the reflector 32 and appropriate on of mirrors 36, 38, and 25 percent (e.g., 1.25 dB) loss as it is coupled to the LWC devices 10 in the on state. With this model, it will take six (6) traverses before the propagation light attenuates by a total of 85 percent, resulting in a display luminance uniformity of greater than about 90 percent. 25 percent (e.g. 1.25 dB) loss due to coupling of light from the waveguide per traverse requires reduced coupling efficiency for the LWC devices. With renewed interest in FIG. 2, in order to decrease the LWC device coupling efficiency, the effective coupling area may be decreased between the flexible membrane 16 and the lower electrode 14. This can be achieved by adding couplers 39, shown in phantom in FIG. 1, to the surface of the flexible membrane 16 or, alternatively, by roughening the contacting surface of either the lower electrode 14 or the flexible membrane 16.

Figure 3C:
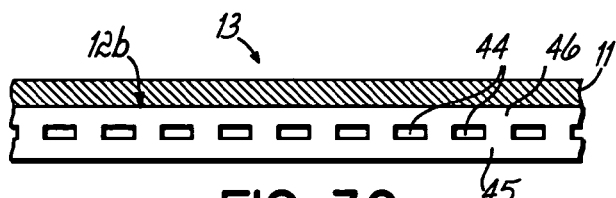
FIGS. 3C and 3D are enlarged cross-sectional views of central portions of waveguides in accordance with alternative embodiments of the invention.

With reference to FIG. 3C, a propagation distributing waveguide 12*b*, of which only a portion is shown in FIG. 3C, for LWC display 13 (FIGS. 3A, 3B) includes gas or vacuum gaps 44 created by adhesively bonding at least two planar waveguides 45, 46 with a patterned optical adhesive. Propagation distributing waveguide 12*b* may improve the luminance uniformity of the LWC display 13. Specifically, the propagation distributing waveguide 12*b* limits the maximum coupling efficiency of the LWC device 13 by partially confining light propagation to each of the optically bonded waveguides 44, 45, as the gaps 44 define regions without light transmission. The lightwave coupled devices 10 of LWC display 13 can then be designed for strong coupling such that LWC device coupling dominates in absorption of short wavelength light over non-desired reflective and transmission losses. It is appreciated that the waveguide 12*b* will include a reflector and light source (not shown) similar to reflector 32 and light source 34 (FIG. 3A). The patterned coupling defined by the gaps 44 can be spatially located in repetitive or non-repetitive arrangements and geometries to provide a desired display luminance uniformity.

Figure 3D:
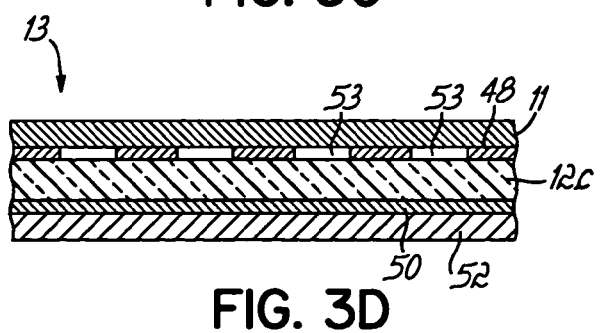

With reference to FIG. 3D, a waveguide 12*c*, of which only a portion is shown in FIG. 3D, includes upper and lower optical cladding layers 48, 50 that increase optical confinement of the propagating short wavelength light. The lower cladding layer 50 is effective for reducing or eliminating reflection losses over regions of contact between waveguide 12*c* and the rear packaging 52 of the display 13. The upper cladding layer 48 is effective for reducing or eliminating reflection losses over regions where the waveguide 12*c* is in contact with either of the spacers 18, 20, electrodes 14, or other LWC device layers. Apertures 53 defined in the upper cladding layer 48 allow short wavelength light to couple from the waveguide 12*c* to the LWC devices 10 (FIG. 1) constituting display 13. It is appreciated that the waveguide 12*c* will include a reflector and light source (not shown) similar to reflector 32 and light source 34 (FIG. 3A). Although illustrated in FIG. 3D as added to waveguide 12 (FIG. 3A), cladding layers 48, 50 may also be added to waveguides 12*a*, 12*b*, and 12*c*.

Suitable cladding layers 48, 50 for a waveguide 12*c* with refractive index of about 1.5 to 2.0 would be magnesium fluoride ($MgF_2$), that has a refractive index of 1.4 at 0.4 µm and should have a thickness ranging from about 1 µm to about 2 µm according to equation (2). Other suitable cladding materials include, but are not limited to, inorganic lithium fluoride (LiF) and organic fluoropolymers such as DuPont TEFLON® AF. In an alternative embodiment, the cladding layers 48, 50 may be formed of a low density of micron-sized spacer materials dispersed in a low index liquid such as water, which has a refractive index of about 1.3, or in a gas sealed by an additional layer disposed greater than about 1 µm away from the waveguide 12 by the micron-sized spacer material. If material of the cladding layers 48, 50 have an index of 1.4 and the material constituting the waveguide 12*c* has an index of 1.5, waveguide edge injection of short wavelength light from gas or vacuum leads to a minimum injection angle of incidence of 54° resulting in a required match to the waveguide/cladding critical angle of 55°. In an alternative embodiment, waveguide 12 (FIG. 2) may be composed of a liquid such as silicone oil enclosed inside a transparent solid waveguide material or cladding, which therefore supplies the liquid medium waveguide its proper geometrical shape.

With continued reference to FIG. 3D, upper cladding layer 48 eliminates reflective loss at spacers 18, 20 and lower electrode 14 (FIG. 1) as long as cladding layer 48 is not strongly absorbing and suitably spaces the spacer 18, 20 or lower electrode 14 from the waveguide 12*c*. The use of cladding layer 48 further allows for much larger area for the spacer 18, 20 and electrode layer 14 without an increase in reflective loss. In this embodiment of the invention, suitable waveguide materials include, but are not limited to, SiON, which can be modified to have a refractive index of 1.5 to 2.0 by adjusting the O to N ratio, aluminosilicate glass such as Corning 1737, which has a refractive index just above 1.5, and Brewer Science OptiNDEX polymers, which can be blended with other polymers to reach a refractive index as high as 1.8.

Figure 4:
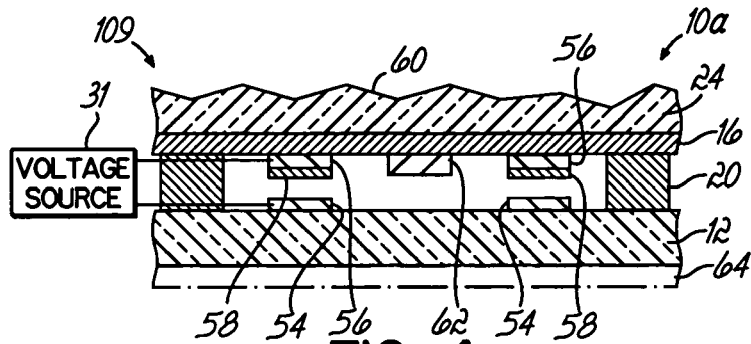
FIGS. 4–11 are cross-sectional views similar to FIG. 1 of modulated lightwave coupling devices in accordance with alternative embodiments of the invention.

With reference to FIG. 4 in which like reference numerals refer to like features in FIG. 1 and in accordance with an alternative embodiment of the invention, a LWC device 10a includes a patterned lower electrode 54 disposed on waveguide 12 and a patterned upper electrode 56 disposed on membrane 16. One or both of the electrodes 54, 56 may include a dielectric coating 58 present to prevent electrical shorting between electrodes 54, 56 for contacting or near contacting proximities. The dielectric coating 58 allows for electrostatic attraction without direct current flow between attracted electrodes 54, 56. Electrodes 54, 56 are electrically coupled with voltage source 31 for providing a first condition in which short wavelength light is transferred from the waveguide 12 to the photoluminescent layer 24 and a second condition in which short wavelength light remains confined in the waveguide 12.

The patterned electrode 54 should purposely encompass only a fractional area of the surface of waveguide 12 since most electrode materials, such as aluminum (Al) having a reflectivity of about 90 percent, significantly attenuate light. In certain embodiments of the invention in which patterned electrode is composed of Al, patterned electrode 54 may cover less than 10 percent of the surface area of waveguide 12. Using an exemplary waveguide 12 that is 0.3 mm long and 3 mm wide, a ray of short wavelength light traveling at 45° incidence will only incident upon the upper surface of the waveguide 12 adjacent to patterned electrode 54 every 6 mm. Therefore the resulting light attenuation during one traverse of the waveguide 12 would be $0.90^n$ where n is the number of times the light is incident on the upper waveguide surface. For the case of Al comprising 10 percent of the upper waveguide surface area, n=0.10×300 mm/6 mm=5 incidence events. The resulting attenuation is $0.90^5$=0.59. It is evident that optical cladding layers 48, 50 (FIG. 3D) would significantly reduce light loss by enhancing the reflectivity of the waveguide 12c.

In an alternative embodiment, a patterned electrode 54 composed of Ag, which has greater than 97 percent reflectance at a wavelength of about 450 nm, may be used in combination with an InGaN short wavelength source 34 (FIG. 3A) injecting blue light at a similar wavelength. In yet another alternative embodiment, the patterned electrode 54 may be suspended by spacers above the waveguide 12 at a distance of about 1 µm, as determined by equation (2). In yet another alternative embodiment, patterned electrode 54 may be composed of a thin ITO layer. A 10 nm thickness of ITO absorbs only 0.5 percent of incident 0.4 µm light, provides about 100Ω/square sheet resistance, and at 10 percent area coverage, will only attenuate short wavelength light by about 2.5 percent for one traverse across the waveguide 12. This attenuation may be combined with the 2 percent attenuation associated with an Al mirrored spacers 18, 20 (FIG. 1) which are about 2 µm×2 µm×1 µm (W×L×H) in dimension and comprise 0.4 percent of a 100 µm×100 µm wide LWC device 10a. For an instance of 50 percent usage of LWC devices 10a in the display 13 (FIG. 3A) and 25 percent coupling efficiency to the LWC devices 10a, this results in a short wavelength light utilization efficiency of about 60 percent. Using the same calculation used for reflective loss, the 25 percent coupling efficiency for one traverse across the display can be calculated to require a coupling area of 0.6 percent of the device area. For such a low coupling efficiency per LWC device 10a, the display 13 will become inefficient for a very low count of pixels on in the display. To increase the efficiency of the LWC display 13, either the pixel coupling efficiency may be increased and/or reflectivity losses may be decreased through use of cladding layers 48, 50 (FIG. 3D).

With continued reference to FIG. 4, an upper surface 60 of the photoluminescent layer 24 may be made partially diffuse to enhance forward outcoupling of fluorescent light emission to the viewer. The upper surface 60 may be made partially diffuse by either adding a distinct partially diffuse layer or by modifying the photoluminescent layer 24. Alternatively, either or both sides of the photoluminescent layer 24, or layers adjacent to either or both sides, may be partially diffuse.

A coupler 62 may be attached to the flexible membrane 16 with a confronting relationship to the waveguide 12. Alternatively, a coupler 66 (FIG. 5) similar to coupler 62 may be attached to the waveguide 12. The coupler 62 may incorporate a single layer or multiple patterned couplers, as illustrated by couplers 39 (FIG. 1). The coupler 62 decreases the coupling area between the flexible membrane 16 and waveguide 12. The coupler 62 also advantageously decreases back-coupling of fluorescent emitted light into the waveguide 12. If significant amounts of fluorescent light were allowed to back couple into the waveguide 12, a full color display could have poor color balance since LWC devices 10 in on state would emit light back into the waveguide 12, which can shift the emission color or luminance of other LWC devices 10 in the on state.

The outcoupling efficiency of the patterned electrode 56, the flexible membrane 16, and the photoluminescent layer 24 (i.e., upper layers) of the LWC device 10 may be calculated by approximating light outcoupling per incidence on the upper surface of the photoluminescent layer 24 as proportional to the series relationship:

$$1+x+x^2+x^3+x^4+x^5\ldots =(1-x)^{-1} \quad (3).$$

Assuming 30 percent forward diffuse scattering efficiency at the upper surface of the photoluminescent layer 24 and a coupling area which comprises 10 percent of the entire LWC device area, a theoretical maximum forward coupling efficiency greater than 60 percent is achieved. Absent the coupler 62, the majority of the upper layers could be coupled to the waveguide 12 allowing only 15 percent forward outcoupling of fluorescent emission, with 85 percent of the emission back-coupled into the waveguide where it is lost and contributes to the undesired effect of pixel cross-talk in a pixelated LWC display 13.

Suitable materials for coupler 62 include, but are not limited to, those materials suitable for the waveguide 12 and flexible membrane 16, as described herein. Coupler 62 should have a thickness adequate to distance the upper layers from the lower layers consistent with equation (2). In certain embodiments of the invention, a suitable thickness for coupler 62 is on the order of, but not limited, to about 0.1 µm to about 10 µm. The coupler 62 may also serve as a transparent electrode if formed, for example, from ITO. Alternatively, the coupler 62 may serve as a transparent electrode when disposed on the waveguide 12.

Because the majority of the area of LWC device 10a is optically transparent, a black absorbing layer 64 may optionally positioned below the waveguide 12, or in contact with cladding 50 (FIG. 3D), to create a dark or black background for the LWC device 10a that furnishes high viewing contrast. Exemplary black absorbing layers 64 are described in commonly-assigned U.S. Pat. No. 6,635,306, the disclosure of which is hereby incorporated by reference herein in its entirety.

Figure 5:
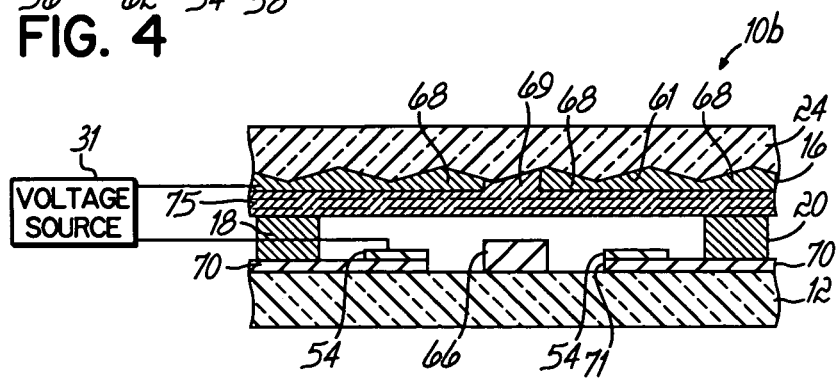

With reference to FIG. 5 in which like reference numerals refer to like features in FIG. 4, a LWC device 10b includes coupler 66, similar in construction to coupler 62, attached to the waveguide 12 and an upper electrode 68 embedded in the flexible membrane 16 and/or photoluminescent layer 24 of the LWC device 10b. The coupler 66 may assume any geometrical shape, such as a rectangular geometrical shape, that promotes efficient transmission or refraction of light from the waveguide 12 and into the photoluminescent layer when the LWC device 10b is in the on state, or internal reflection of short wavelength light back into the waveguide 12 if the LWC 10b device is in the off state. The upper electrode 68 serves the purpose as an electrode for electrostatic actuation and as a reflector for improving outcoupling of fluorescent light to the viewer. The LWC device 10b further includes a cladding layer 70, similar to cladding layers 48, 50 (FIG. 3D), that physically separates the lower electrode 54 and spacers 18, 20 from the waveguide 12. A lower surface 61 of photoluminescent layer 24 may be optionally rendered partially diffuse, as described above with regard to the upper surface 60, to improve the forward outcoupling efficiency to the viewer.

The coupler 66 is aligned vertically with one or more apertures 69 defined in the upper electrode 68 and with one or more apertures 71 defined in the cladding layer 70, such that light is efficiently coupled from the waveguide 12 and into the photoluminescent layer 24 when the flexible membrane 16 is electrostatically actuated into contact with the coupler 66. Using equation (3) and assuming a 10 percent aperture area for reflective upper electrode, a theoretical maximum forward coupling efficiency greater than about 77 percent is achieved. Because the majority of the area of LWC device 10b is optically reflective, an optical element (not shown), such as a neutral density plate, color filter plate, or circular polarizer plate, may be disposed between the display observer and each LWC device 10b to give the LWC device 10b a black background appearance. Use of such filters is well known by those skilled in the art of displays. Optionally, non-emitting surfaces that reflect ambient light may be contrast-enhanced by adding black paints or black matrix, such as chromium oxide (CrO), familiar to persons of ordinary skill in the art of displays. The reflective upper electrode 68 also prevents the majority of short wavelength light scattered by imperfections in the waveguide 12 from reaching the photoluminescent layer 24, which reduces the off-state luminance of the LWC device 10b and is one factor in determining the maximum contrast of the LWC device 10b. The reduction in off-state luminance can be similarly achieved by introducing any opaque layer (not shown) between the photoluminescent layer 24 and the waveguide 12, so long as the opaque layer contains an aperture sufficient for allowing adequate switchable coupling between the waveguide 12 and photoluminescent layer 24.

In an alternative embodiment of the invention, the flexible membrane 16 may optionally incorporate or comprise an optical layer 75 that creates a step or graded refractive index profile when in contact with the waveguide 12, as described in FIG. 1, or in contact with coupler 66 on the waveguide 12, as described in FIG. 5. A step refractive index profile for optical layer 75, with the index profile continued into the upper layers, allows coupling of light from the waveguide 12, into the optical coupler 66, and on into the photoluminescent layer 24, but prevents back coupling of light emitted by the photoluminescent layer 24 to the waveguide 12 through internal reflection according to equation (1). A step profile for the refractive index of optical layer 75 does, however, lead to reflective losses arising from Fresnel reflection that increases very strongly with angle of incidence.

An alternative embodiment of the optical layer 75, which exhibits lower reflective losses, will include a multi-step index that decreases the total magnitude of Fresnel reflection. Another alternative embodiment of the optical layer 75 exhibiting lower reflective losses will be a graded index layer (infinite step index) that prevents Fresnel reflection but provides the desired directional coupling. Suitable optical layers 75 include SiON, which achieves an increase of refractive index of 1.5 to 2.0 with increasing O to N ratio. Suitable optical layers 75 also include layered polymers consisting of Brewer Science OptiNDEX polymers with can achieve a refractive index varying from about 1.7 to about 1.9. A layered polymer can achieve an index gradient since the solvent used in liquid deposition of each polymer layer partially dissolves the upper interface of the underlying polymer layer, causing mixing, and therefore a compositional and refractive index gradient. Suitable thicknesses for the optical layer 75 include, but are not limited to, about 0.1 μm to about 100 μm. The optical layer 75 may be a patterned or a continuous film. Alternatively, the coupler 62 (FIG. 4) may incorporate the optical layer 75.

Figure 6:
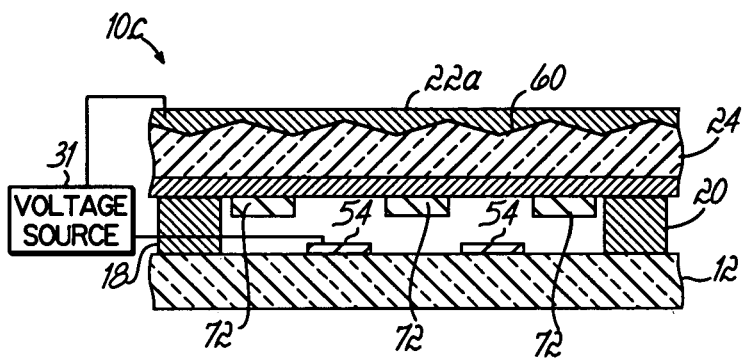

With reference to FIG. 6 in which like reference numerals refer to like features in FIGS. 4 and 5, a LWC device 10c may be configured with a reflective upper electrode 22a such that the fluorescent emission can be directed to exit through the waveguide 12. Unless the waveguide 12 is about an order of magnitude thinner than the width of the area of fluorescence, the majority of the emitting area of the upper layers should be out of optical contact with waveguide 12. For emitted fluorescence from upper layers in contact with the waveguide 12, only about 15 percent is emitted onto the viewer due to internal reflection and propagation within the waveguide 12. For emitted fluorescence from upper layers out of contact with the waveguide, 90 percent is emitted onto the viewer with the 10 percent loss arising from Fresnel back reflection. The interface between the upper electrode 22a and photoluminescent layer 24 may be partially diffuse, as described herein, to enhance outcoupling of emitted light to the viewer. The LWC device 10c includes patterned couplers 72 that allow the photoluminescent layer 24 to receive short wavelength light at multiple locations, hence increasing the uniformity of the emitted fluorescence from the photoluminescent layer 24. Electrodes 22a and 54 are electrically coupled with voltage source 31 for providing a first condition in which short wavelength light is transferred from the waveguide 12 to the photoluminescent layer 24 and a second condition in which short wavelength light remains confined in the waveguide 12.

Figure 7:
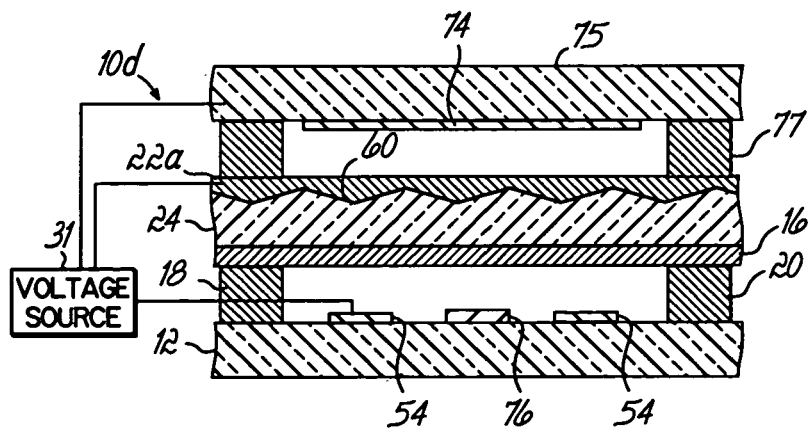

With reference to FIG. 7 in which like reference numerals refer to like features in FIG. 6, a LWC device 10d includes a release electrode 74 that assists the tensile stress in lifting the flexible membrane 16 out of contact with a coupler 76 disposed on the waveguide 12. The release electrode 74 is of particular use for the case of a flexible membrane 16 characterized by a weak restoring force or the instance of a relatively strong inherent electrostatic sticking force between contacting portions of flexible membrane 16 and coupler 76. The release electrode 74 electrostatically pulls the flexible membrane 16 in a direction away from the waveguide 12 when a voltage differential is applied between the release electrode 74 and the upper electrode 22a. The release electrode 74 is physically supported on a support 75 and is suspended above the photoluminescent layer 24 by a rigid spacer 77 composed of preferably silica glass of about 1 to 100 μm thickness. The release electrode 74 is of thickness and composition comparable to those listed for electrodes 14 and 22. Release electrode 74 is also electrically coupled with voltage source 31 for assisting in lifting the flexible membrane 16 from the first condition, in which short wavelength light is transferred from the waveguide 12 to the photoluminescent layer 24, to the second condition, in which flexible membrane 16 is out of contact or proximity with coupler 76 and short wavelength light remains confined in the waveguide 12.

Figure 8:
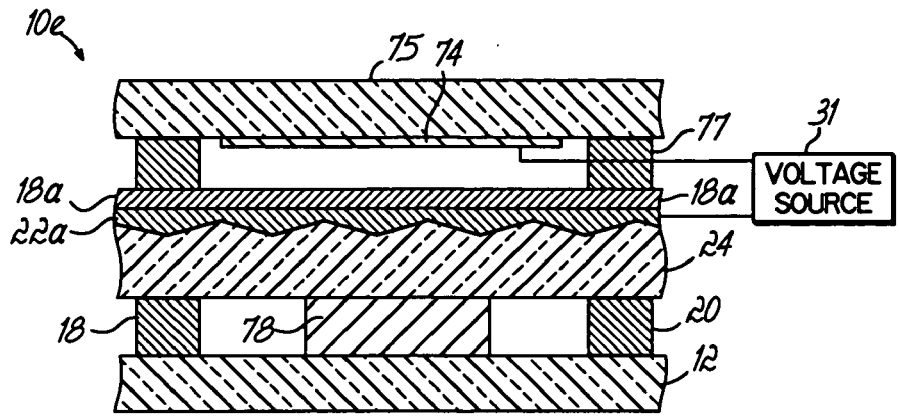

With reference to FIG. 8 in which like reference numerals refer to like features in FIG. 7 and in accordance with an alternative embodiment of the invention, an electrodeless or electrode-free waveguide LWC device 10e includes a coupler 78 of a thickness comparable to or greater than a thickness of spacers 18, 20. Typically, the coupler 78 will have a thickness ranging from of about 0.1 μm to about 100 μm, depending upon the thickness of spacers 18, 20. The coupler 78 mechanically couples the photoluminescent layer 24 to the waveguide 12. The coupler 78 is permanently attached on one surface to either the waveguide 12 or the photoluminescent layer 24. Only through electrostatic actuation is the coupling of short wavelength light into the photoluminescent layer 24 prevented. Applying voltage from the voltage source 31 to the release electrode 74 disposed above a flexible membrane layer 18a provides the electrostatic actuation. The electrostatically-actuated photoluminescent layer 24, upper electrode 22a, and flexible membrane 18a may be alternatively fabricated on the substrate 75 that supports the release electrode 74. The waveguide 12 is bonded to the face of the substrate 75, which contains the electrostatically-actuated photoluminescent layer 24, upper electrode 22a, and flexible membrane 18a and spacers 18, 20, and 77.

The configuration of LWC device 10e permits waveguide 12 to be formed from relatively low melting point polymers, such as PMMA, while allowing for high temperature (greater than about 150° C.) fabrication of the remaining constituent components of LWC device 10e on a separate silica glass substrate 75. Alternatively, the substrate 75 may be comprised of crystalline silicon on which additional display driver circuitry can be provided. Alternatively, the substrate 75 can be comprised of flexible material such as steel, copper, or DuPont KAPTON® on which LWC device 10e is fabricated and subsequently laminated to the waveguide 12. Multiple substrates and attachment techniques for LWC device fabrication and waveguide attachment are possible as recognized by persons skilled in the art of flat panel displays and electro-static membranes. Similar fabrication on a support substrate is also suitable for other LWC device embodiments of the invention.

Figure 9:
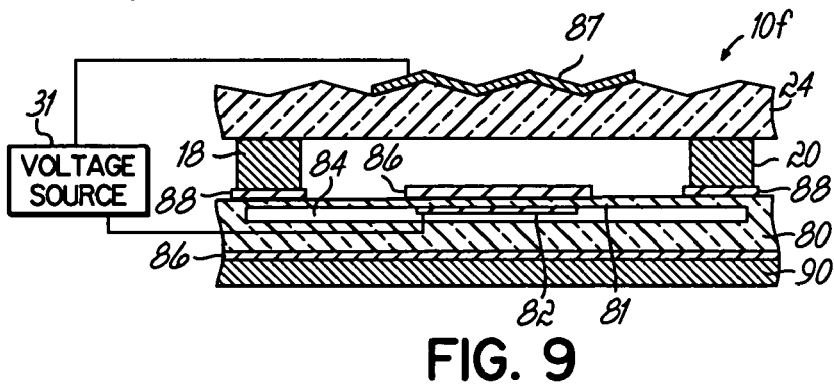

With reference to FIG. 9 and in accordance with an alternative embodiment of the invention, a LWC device 10f is linked with a waveguide 80 having a flexible portion 81 of waveguide 80, capable of being electrostatically actuated in and out of proximity with the photoluminescent layer 24, as separated by coupler 86. Suitable flexible materials for waveguide 80 include SiON, silica glass, and PMMA. Disposed on a lower surface of the flexible portion 81 of the waveguide 80 is a lower electrode 82 that is electrically coupled with voltage source 31. The lower electrode 82 may alternatively be disposed on an upper surface of the flexible portion of the waveguide 80, or within the interior of the waveguide 80. A gas-filled or vacuum gap 84, typically in the thickness range of about 0.01 μm to about 100 μm, is defined beneath the upper flexible portion 81 of the waveguide 80 such that flexible portion 81 is freely actuated. An upper electrode 87 is also electrically coupled with the voltage source 31 so that voltage selectively applied between the electrodes 82, 87 moves the upper flexible portion 81 between the first condition, in which short wavelength light is transferred from the waveguide 80 to the photoluminescent layer 24, and the second condition, in which the upper flexible portion 81 is out of contact or proximity with photoluminescent layer 24 so that short wavelength light remains confined in the waveguide 80.

The upper portion 81 of waveguide 80 may have a thickness in the range of about 0.1 μm to about 100 μm and the overall thickness of waveguide 80 may be about 0.1 μm to about 10 mm. Cladding layers 86, 88 may be provided on the waveguide 80 so that the waveguide 80 may be carried on an additional substrate 90 for physical support. Suitable supporting substrates 90 include, but are not limited to, silica glass, silicon, and polycarbonate. A thinner waveguide 80 and supporting substrate 90 may be incorporated into LWC devices 10 and 10a–e if the cladding layer 86 is included at the bottom of the waveguide 80. Alternatively, the supporting substrate 90 may be integral with the waveguide 80, a suitable example being a PMMA waveguide 80 supported by, and optically bonded to, a silica glass substrate 90.

Figure 10:
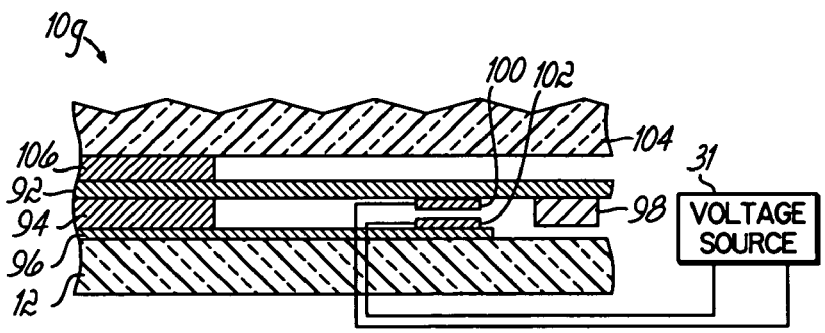

With reference to FIG. 10 in which like reference numerals refer to like features in FIG. 1, a LWC device 10g includes a cantilever beam 92 disposed above a waveguide 12 by a spacer 94 and a cladding layer 96. Disposed on the cantilever beam 92 is a coupler 98 that is electrostatically actuated in and out of contact with the waveguide 12 by applying a differential voltage from voltage source 31 to electrodes 100, 102 disposed onto the cantilever beam 92 and cladding layer 96, respectively. When in contact with the waveguide 12, the coupler 98 allows light to propagate into the cantilever beam 92 where it eventually propagates into a photoluminescent medium or layer 104 causing the photoluminescent layer 104 to fluoresce. The photoluminescent layer 104 is kept out of contact with the cantilever beam 92 by a second permanently fixed coupler 106. Alternatively, the photoluminescent layer 104 may be placed on and carried by the cantilever beam 92. In yet another alternative embodiment, the cantilever beam 92 may be carried by the waveguide 12 and actuated in and out of contact with the photoluminescent layer 104, which may be particularly effective and efficient if the coupling efficiency from the waveguide 12 to the photoluminescent layer 104 requires only a small area (about 1 percent) of the entire LWC device 10g. Because the electrostatically coupled portion is spatially separated from the photoluminescent portion of the LWC device 10g, the coupling and photoluminescent portions of the LWC device 10g may be separately optimized.

The invention contemplates that the electrostatic actuation may be accomplished by any mechanism, including by not limited to electrostatic membranes and cantilever beams as described herein, that allows for switchable optical coupling between a waveguide and a photoluminescent layer as recognized by persons of ordinary skill in the art of microelectromechanical systems. Furthermore, the invention contemplates that additional layers may be added onto or between individual device layers to improve physical, electrical, or optical properties of the exemplary LWC devices and displays.

Figure 11:
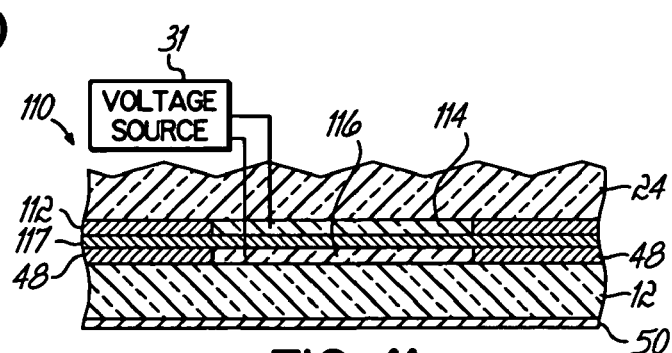

With reference to FIG. 11 in which like reference numerals refer to like features in FIGS. 1 and 3D, an LWC device 110 includes waveguide 12 with cladding layers 48, 50, an electro-optic liquid crystal layer 117 that changes in refractive index with applied field applied by voltage source 31 between two transparent electrodes 114, 116 to provide electro-optical modulation of emission intensity, and a reflector 112 surrounding the electrode 114. The changes in refractive index alter the criterion for internal reflection of short wavelength light in the waveguide 12 and, therefore, modulate coupling efficiency of short wavelength light from the waveguide 12 and into the photoluminescent layer 24. Suitable materials for the liquid crystal layer 112 include, but are not limited to, nematic liquid crystals, ferroelectric liquid crystals, and a polymer dispersed liquid crystal or cholesteric liquid crystal that would modulate coupling of light from the waveguide 12 into the photoluminescent layer 24 by providing a multi-directional refractive effect. In an alternative embodiment, a solid electro-optic polymer or inorganic crystal may be substituted for the liquid crystal layer 112. The performance, choice, and implementation of electro-optic liquid crystals and polymers is well known by those skilled in the art of liquid crystal displays, modulators, and optical fiber modulators. Generally, most electro-optic materials are birefringent and work as an optical switch of the invention for linearly polarized light. For use of the birefringent liquid crystal layer, the short wavelength light is preferably injected into the waveguide 12 such that it is linearly polarized, or such that the short wavelength light incurs incidence upon polarization recycling media such as 3M Vikuiti™ film according to techniques well known by those skilled in the art of liquid crystal display design. The LWC device 110 may also incorporate other features, such as couplers, described herein in the context of the electrostatically actuated devices.

Figure 12:
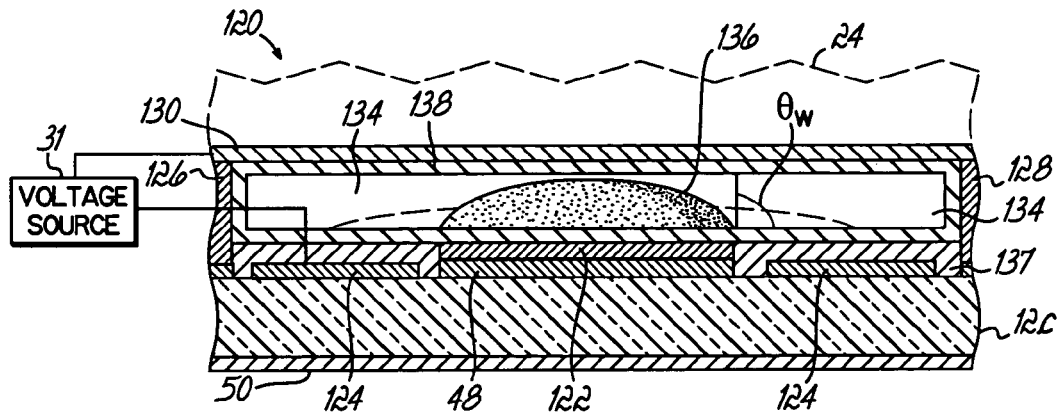
FIG. 12 is a cross-sectional view of an electrowetting-modulated lightwave coupling device in accordance with an embodiment of the invention.

With reference to FIG. 12 in which like reference numerals refer to like features in FIG. 3D and in accordance with an alternative embodiment of the invention, a LWC device 120 that relies on electrowetting actuation includes waveguide 12c with cladding layers 48, 50, a reflector element 122 which may also serve as an electrode, patterned transparent electrodes 124, spacers 126, 128, and an electrically insulating dielectric 137. Upper transparent electrode 130 may also be coated with an insulating dielectric similar to insulating dielectric 137. Encapsulated in a space defined between the waveguide 12c and the upper transparent electrode 130 are a volume of low refractive index, electrolytic or conductive liquid carrier 134, such as salt water, and a body of a liquid photoluminescent medium 136. Photoluminescent medium 136 has a refractive index similar to waveguide 12c and is immiscible with liquid carrier 134. Any or all surfaces contacted by the liquid carrier 134 and/or the photoluminescent medium 136 may include a thin hydrophobic coating 138, which increases the contact angle of the liquid carrier 134 with the coating 138 and reduces the required voltage for electrowetting. Voltage source 31 is electrically coupled with electrodes 124, 130 for selectively applying voltage to provide the first condition, in which short wavelength light is transferred from the waveguide 12 to the photoluminescent medium 136, and the second condition, in which short wavelength light remains confined in the waveguide 12.

An exemplary transparent electrode 124, 130 is 10 nm of ITO. An exemplary dielectric coating 137 on the transparent electrode would be 0.01 to 10 µm of $BaTiO_3$ or other high capacitance oxide based dielectrics. An exemplary hydrophobic coating 138 would be a 0.001 to 10 µm thick layer of a highly hydrophobic fluoropolymer such as DuPont TEFLON® AF.

The photoluminescent medium 136 generally has a refractive index similar to the waveguide 12c and contains non-polar fluorescent dye dissolved in alkanes (typically $C_{10}$–$C_{16}$). If a voltage is applied between any two electrodes the surface contact angle $\theta_w$ for liquid carrier 134 is decreased causing it to repel liquid layer 136 away from electrodes 124, 130 on which voltage is applied from voltage source 31. If no voltage is applied to electrodes 124, 130 from voltage source 31, the contact angle $\theta_w$ for liquid carrier 134 increases to an inherent value, causing liquid photoluminescent medium 136 to re-wet the surfaces it was repelled from during application of voltage, as indicated in dashed lines in FIG. 12.

With continued reference to FIG. 12, the absence of applied voltage allows the liquid photoluminescent medium 136 to contact areas of the waveguide 12c not coated with cladding 48, and therefore fluoresce upon receiving short wavelength light from the waveguide 12c. By using salt water (refractive index of about 1.3) or another low refractive index liquid carrier 134, the transparent electrodes 124 not contacted with oil automatically behave as a cladding layer and internally reflects short wavelength light. Multiple electrode arrangements are possible and are not limited to the specific electrode arrangement of FIG. 12, so long as the electrode arrangements provide switchable electrowetted optical coupling to a photoluminescent medium. In an alternate embodiment, liquid carrier 134 and photoluminescent medium 136 may be switched in position therefore reversing the voltage response of the LWC device 120. In other alternate embodiments, liquid carrier 134 and photoluminescent medium 136 may be switched in refractive index and in terms of which liquid contains the fluorescing medium or is electrolytic or conducting. Component arrangements for electrowetting devices are discussed in M. G. Pollack, A. D. Shenderov, and R. B. Fair, Lab Chip, 2, pp. 96–101, 2002, the disclosure of which is hereby incorporated by reference herein in its entirety.

In an alternative embodiment of the invention, photoluminescent layer 24 is provided above the LWC device 120 and carrier liquid 134 and photoluminescent medium 136 are composed of a liquid that is not photoluminescent. The coupling of short wavelength light from the waveguide 12c controlled through modulating the curvature of a coupling lens formed from the non-photoluminescent liquid by electrowetting. In this alternative embodiment, cladding layer 48 and reflector 122 are partially or fully removed or disposed from below the non-photoluminescent liquid, which acts as a switchable optical lens that changes in lens curvature and focuses short wavelength light from the waveguide 12c into the photoluminescent layer 24 or internally reflects short wavelength light back into the waveguide 12c. Multiple arrangements of electrodes, liquids, and other device layers are envisioned within the spirit and scope of the invention.

Figure 13:
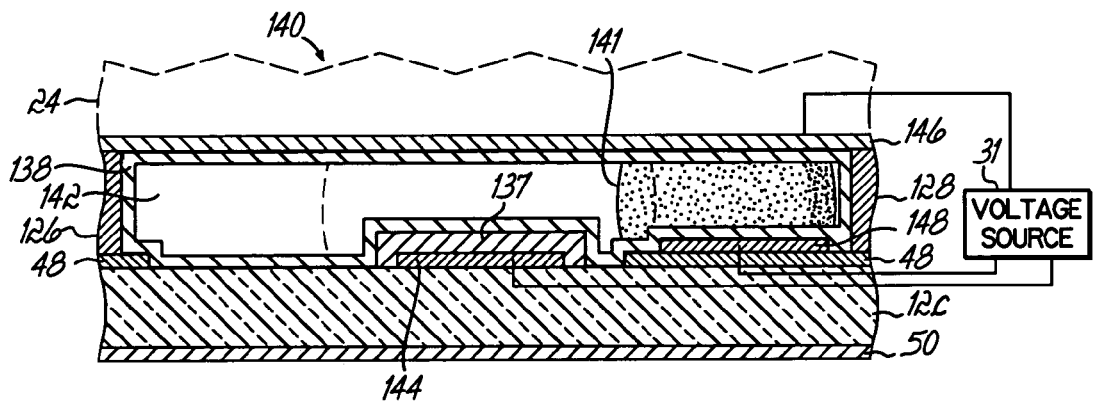
FIG. 13 is a cross-sectional view similar to FIG. 12 of an electrowetting-modulated modulated lightwave coupling device in accordance with an alternative embodiment of the invention.

With reference to FIG. 13 in which like reference numerals refer to like features in FIG. 12, a LWC device 140 is shown that relies on electrowetting for modulating optical coupling between the waveguide 12c and a distinct photoluminescent layer 24. The LWC device 140 includes a lower transparent electrode 144, an upper transparent electrode 146, and a lower electrode 148, which may optionally be transparent, reflective or opaque. Any or all of the electrodes 144, 146, 148 may be coated with a dielectric coating 137, as depicted in FIG. 13 for lower transparent electrode 144. Any or all surfaces contacted by the immiscible liquids, liquid 141 or liquid 142, may include hydrophobic coating 138, which increases the contact angle of the liquid 141 with the coating 138 and hence, reduces the required voltage for electrowetting.

Electrodes 144, 146, 148 are electrically coupled with voltage source 31. If a voltage is applied between any two of electrodes 144, 146, 148, the surface contact angle $\theta_w$ for liquid 141 is decreased causing it to repel the body of liquid 142 away from electrodes 144, 146, 148 to which voltage is applied. This effectively causes liquid 141 to move towards the electrode to which voltage is applied, as indicated by dashed lines in FIG. 13. For the particular arrangement of FIG. 13, but not limiting in possible alternative arrangements, liquid 141 should have a refractive index comparable to waveguide 12*c*, and liquid 142 should have lower refractive index such that it acts as a switchable cladding.

In an alternate embodiment of the invention, liquid 141 and liquid 142 may be switched in refractive index and in terms of which is electrolytic. Multiple electrode arrangements are possible and are not limited to the specific arrangement of FIG. 13, so long as the electrode arrangements provide switchable electrowetted optical coupling to a photoluminescent medium. In another alternate embodiment, liquid 141 and liquid 142 may be switched in position therefore reversing the voltage response of the LWC device 140. In yet another alternative embodiment of FIG. 13, either or both of liquid 141 and liquid 142 may be photoluminescent resulting in LWC switching similar to that described with regard to FIG. 12. It is understood that the switching for the electrowetting LWC devices 120, 140 is not necessarily not binary or bi-stable in nature and that grayscale operation (intensity modulation) may be achieved through available techniques and through creation of cladding 48 apertures which increase in area linearly, parabolically, or by other mathematical dependence, in a direction in which electrowetting occurs.

In either LWC device 120 (FIG. 12) or LWC device 140 (FIG. 13), either liquid carrier 134 or photoluminescent medium 136, liquid 141 or liquid 142, may be fully or partially replaced with an air or vacuum environment which would then acts a switchable cladding layer (n~1.0) for the waveguide 12*c* according the principles of operation for electrowetting LWC devices of the invention. The LWC devices 120, 140 may also incorporate other features described herein in the context of the electrostatically actuated devices. The invention contemplates that other suitably controllable electro-wetting mechanisms, as are familiar to persons of ordinary skill in the art of electrowetting and microfluidics, capable of optically coupling or decoupling the waveguide 12*c* and photoluminescent layer 24 or photoluminescent liquids 136, are within the spirit and scope of the invention. The invention contemplates that LWC devices in which a coupling liquid or gel layer is physically displaced by mechanical actuation is well known to persons of ordinary skill in the art of microfluidics and micro-electro-mechanical systems. As a non-limiting example, an electrostatic membrane may be used to displace a coupling liquid from an area of an LWC device that includes a cladding layer on the waveguide to an area the LWC device which does not include a cladding layer.

Figure 14:
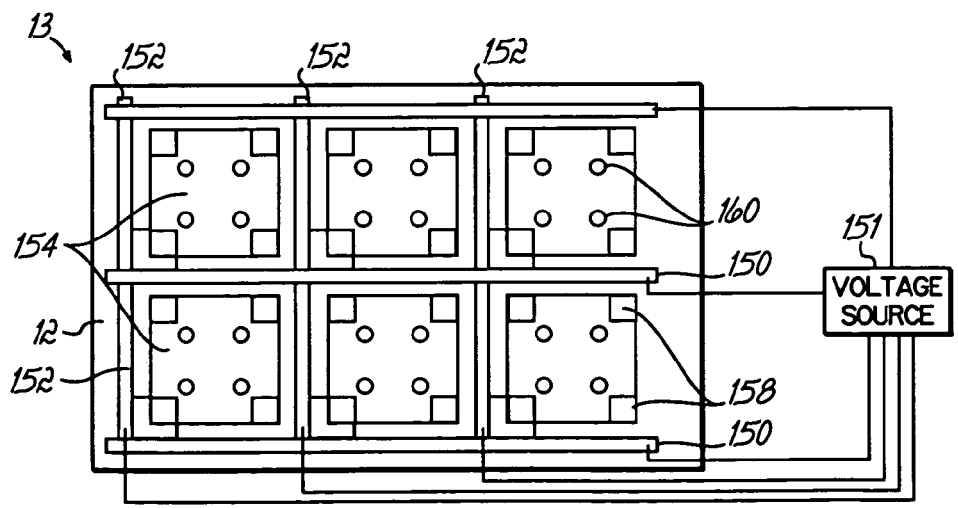
FIG. 14 is a cross-sectional view of a re-configurable information display incorporating multiple devices of the invention.

With reference to FIG. 14 in which like reference numerals refer to like features in FIGS. 1–13, any of the LWC devices 10, 10*a*–*g*, 110, 120, and 140 described herein may be spatially arranged to create a display 13. Although the exemplary display 13 is described below in the context of electrostatically-modulated devices as pixels 154, it is appreciated that the display may include individual LWC devices or pixels 154 actuated by electro-optic and electrowetting techniques as described herein. Furthermore, it is appreciated that the display may include variations of electro-static, electro-optic and electrowettting techniques derived from the scope and spirit of the invention. Exemplary electro-static, electro-optic, and electro-wetting actuation techniques are described in X. Ma and G. S. Kuo, IEEE Optical Communications, Vol. 41, No. 11, pp S16–S23, November 2003, and in M. G. Pollack, A. D. Shenderov, and R. B. Fair, Lab Chip, 2, pp. 96–101, 2002, the disclosures of which are hereby incorporated by reference herein in their entirety. Each of the electrostatically-actuated pixels 154 incorporates spacers 158 and, optionally, couplers 160, as described herein. An array of row electrodes 150 and column electrodes 152 defines a passive matrix of pixels, generally indicted by reference numeral 154, that may be addressed with, or without, the use of thin-film-transistors (not shown) in an active matrix drive scheme. Each of the pixels 154 may be configured as full color (red, green, and blue), multicolor, or monochrome. In an alternate embodiment of the invention, multiple LWC devices, as described herein, are arranged as a display 13 having the form of a segmented display panel that can be used to display symbols or alphanumerical information. It should be noted, that an LWC display, if transparent could emit light from sides of the display 13, which increases the number of maximum viewers.

Regardless of whether driven in an analog or digital format, common video enhancement techniques may be used to maximize the response speed, contrast, color purity, and luminance uniformity of display 13. These common techniques are well known to persons of ordinary skill in the art of liquid crystal, electroluminescent, plasma, field-emission, and cathode-ray tube displays.

With continued reference to FIG. 14, panel luminance level and uniformity, irrespective of percentage of pixels 154 in the on state, may be boosted by using a low loss waveguide 12*c* with a cladding layer 48, 50 (FIG. 3D). Panel luminance level, which varies as the percentage of LWC devices 10 of display 13 in the on state changes from display frame to display frame, may be maintained substantially constant by modulating the intensity of the short wavelength light source(s) 34 (FIG. 3A). Amplitude, frequency, or duty cycle modulation of CCL and LED short wavelength light sources 34 generally have a response time of less than 1 ms which is fully adequate for supporting a typical display frame rate of 60 Hz. The intensity modulation is preferably performed though additional circuitry and/or display software that analyzes the incoming video signal and calculates via an algorithm the correct power to be provided to the short wavelength light sources 34. This power distribution could also be non-uniformly distributed to short wavelength sources at multiple locations of the waveguide 12. Dimming display 13 for day/night use, such as in automobile usage, is also easily achieved using similar techniques.

The average emitted luminance from the pixels 154 may be modulated by applying a voltage differential from a voltage source 151 between electrodes 150, 152 of those pixels 154 to be electrostatically attracted. One of the two electrodes 150, 152 may be held at ground potential (i.e., zero volts) or at a voltage having the opposite polarity of the opposing electrode 150, 152, so long as an electric field is applied between the pixels 154 to provide electrostatic attraction. It is appreciated that multiple different techniques apparent to persons of ordinary skill in the art may be used to provide electrostatic actuation.

In a pixelated full color LWC display 13, red, green, and blue photoluminescent pixels 154 would be arranged and addressed within the matrix of row and column electrodes 150, 152. As an example, a net voltage differential of 5 volts may used to affect electrostatic actuation of each pixel 154, with a 2.5-volt hold voltage utilized to maintain the electrostatic actuation. This is possible if the combined inherent electro-static force and the 2.5 volt induced static force are greater than the restoring force. A ground, or 0 volt, signal would be applied to allow the restoring force to return the actuated layers to their original location. In a row-column electrode format, an exemplary addressing scheme, assuming that pixels 154 are in a normally off state, would be to sequentially address row electrodes 150 with 0 volts and hold all non selected row electrodes 150 at 2.5 volts. The column electrodes 152 would then provide either 0 volts or 5 volts as each row electrode 150 is selected and held at 0 volts. Therefore, only when one of the row electrodes 150 is selected will one of the pixels 154 be switched into on or off emission states. This form of operation is bi-stable, and results in addressing of a multi LWC device array with passive matrix row and column electrodes addressing. Alternatively, active matrix addressing can be employed with use of thin-film transistors (not shown) at each pixel 154 that holds the appropriate on or off voltage to the pixel 154.

For gray-scale operation several approaches are suitable and include using spatial dithering of multiple sub-pixels addressed per pixel 154 (i.e. 16 sub-pixels in 1 pixel for 16 levels of grayscale). Alternatively, voltage modulation can be used through capacitive charge up of each pixel 154 in the on state, the amount of charge proportional to the applied voltage, the averaged luminance proportional to the amount of built up charge if a parallel leak resistor (not shown) is utilized to slowly dissipate the charge/field between the electrostatic plates. This, however, requires a rectifying diode (not shown) at each pixel 154 to block charge leakage back into the electrode 150, 152 supplying the modulation voltage. Other commonly known approaches, such as subframe frequency modulation, duty cycle modulation, and amplitude modulation, are also applicable to LWC grayscale operation. Generally, electrostatic devices have a response time on the order of about 10 kHz to about 1000 kHz, which makes frequency or duty cycle modulation fully possible.

Active matrix addressing of pixels 154 opens up several attractive possibilities for grayscale operation. Suitable methods include pulse width modulation, or duration, per each panel refresh, that a given pixel 154 is held in the on state. The pulse width modulation approach is particularly attractive, with the pulse width control supplied by a TFT circuit and triggered by voltage modulation on the row electrodes 150 and column electrodes 152.

Unlike interference modulated display pixels that must keep the electrode plates parallel for proper operation, electrostatic pixels 154 permit the membranes 16 and associated upper electrode 22 (FIG. 1) to be flexible across the entire pixel cell. This would in turn allow grayscale modulation by increasing or decreasing the area or number of coupling contacts by having several levels of voltage applied between the electrostatic electrodes. Different response with different levels of voltage across the pixel 154 can be achieved by having couplers, such as coupler 62 (FIG. 4), of varying thickness or separation distance, the couplers 62 with larger thickness or close separation requiring less voltage in order to be actuated into a coupling state. Furthermore, the electro-optic device 110 (FIG. 11) may also be modulated in emitted luminance by modulating the applied voltage (electric field) to the electro-optic element, therefore modulating the amount of light coupled from the waveguide 12 and into the photoluminescent layer 24. Furthermore, the electrowetting devices 120, 140 (FIGS. 12 and 13) may also be modulated in emitted luminance by modulating the applied voltage to the attracting or repelling electrode, therefore creating several levels of partial optical coupling. Alternatively, the electrowetting devices 120, 140 may be modulated in emitted luminance by having multiple electrodes, one for each level of grayscale to be achieved, and each electrode receiving voltage in order to actuate a respective level of grayscale.

Figure 15:
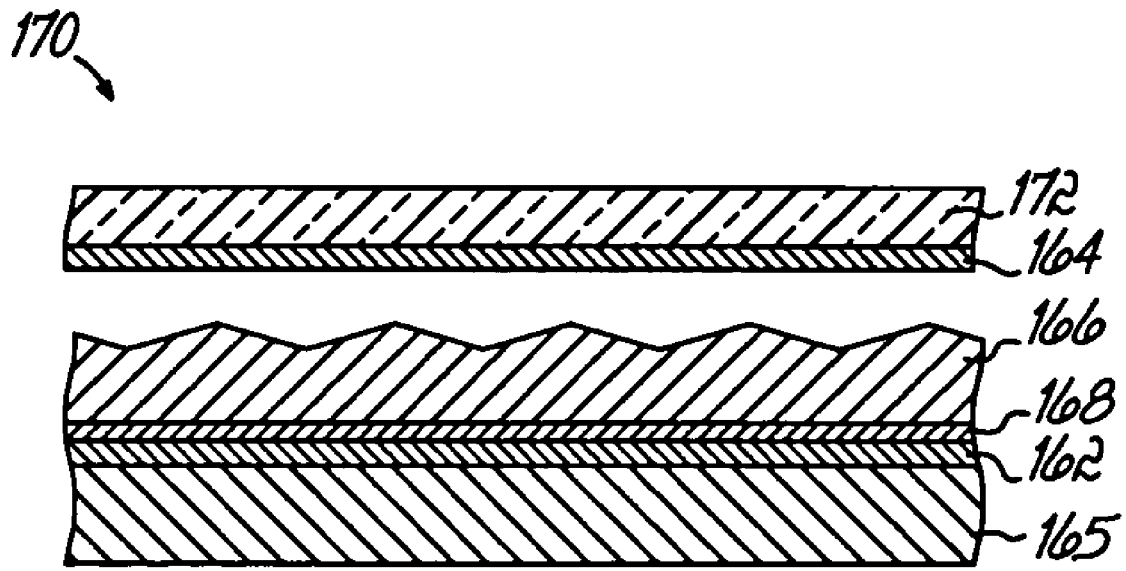
FIG. 15 is a cross-sectional view of a low reflectivity emissive device in accordance with the principles of the invention.

With reference to FIG. 15 and in accordance with an alternative embodiment of the invention, a device 170 includes at least two color filters 162, 164 for decreasing ambient reflection from the LWC device 170 without significant loss in emitted luminance. Furthermore, color filter 164 absorbs short wavelength ambient light and prevents ambient light absorption and excitation of a photoluminescent medium or layer 166. The reduction of ambient light reflection and fluorescence has the effect of increasing display contrast ratio.

Color filter 162, which is optically transparent only at relatively short wavelengths such as ultra violet, violet, or blue light, is disposed between a light source 165 and a photoluminescent layer 166. An optical layer 168 comprising one of a gas or vacuum gap, step index, or graded index layer is disposed between color filter 162 and photoluminescent layer 166. Optical layer 162 prevents longer wavelength fluorescent light emission in the photoluminescent layer 166 from back-coupling into the color filter 162 where it would be absorbed. Color filter 164 is optically transparent only at wavelengths where color filter 162 is optically opaque. Furthermore, the color filter 164 is optically transparent only to longer wavelength light (green, yellow, red). Color filter 164 is positioned on a color filter plate 172 that serves as the viewing glass in a display panel or, alternatively, may be in contact with the photoluminescent layer 166.

The device 170 has the capability of minimal attenuation of emission of fluorescence while eliminating ambient light reflection from layers underlying the color filter 164, which provides a black background appearance. Suitable materials for color filters 162, 164 include Brewer Science PSC filter resins and other color filter materials well known by those skilled in the art of displays. Suitable color filter thicknesses range from about 0.1 μm to 100 μm. The color filters 162, 164 may be continuous films or suitably patterned films. In an alternate ordering scheme, the optical filter 162 may be a short wavelength reflector disposed to the side of a transparent short wavelength light source 165 facing away from the photoluminescent layer 166. This optically filtering reflector would reflect short wavelength light and absorb all ambient light passed through the second long wavelength optical filter 164. Suitable short wavelength light sources 165 include the waveguides of LWC devices, inorganic and organic light emitting diodes, inorganic electroluminescent phosphors, cathodoluminescent phosphors, photoluminescent phosphors, and light emitting plasmas. Suitable implementation of such short wavelength sources in display devices is well known by those skilled in the art. The device 170 may also be used to fabricate LED indicator lights that are black in appearance when turned off.

Figure 16:
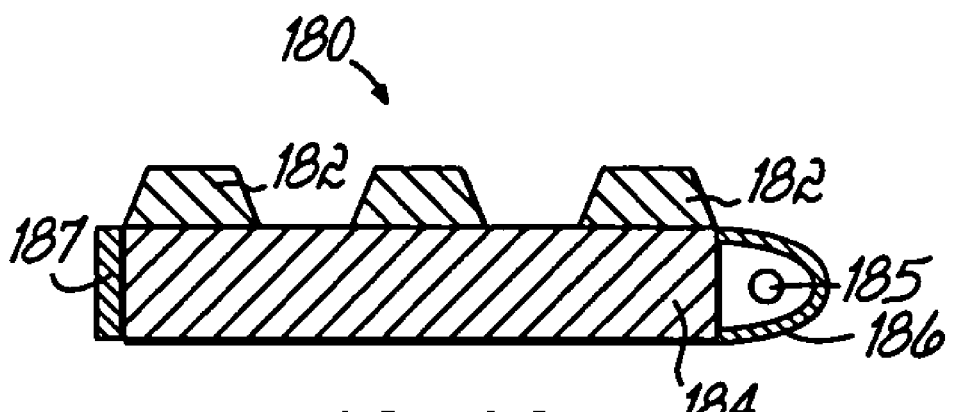
FIG. 16 is a cross-sectional view of a signage display in accordance with the principles of the invention.

With reference to FIG. 16, a signage display 180 may be formed by a pattern of photoluminescent features 182 formed on a waveguide 184. Multiple waveguides and adjoining photoluminescent features (not shown but identical to waveguide 184 and layer 182) may be arranged in an overlapping relationship to supply the signage display 180 with a video like effect based on modulation of the short wavelength light source intensity injected into each individual waveguide 184. Furthermore, non-planar waveguides 184, such as cylinders or other curved shapes, may be used if the radius of curvature does not largely cause an exceeding of the critical angle for propagating short wavelength light in the waveguide 184. This signage display 180 provides a unique format for creating efficiently luminescent, flexible, and transparent signage and may also be useful as an efficient backlight for a liquid crystal display, which would then not require color filtering. A light source 185 and reflector 186, similar to light source 34, provides light of a suitable wavelength to the waveguide 184, which is subsequently provided to the photoluminescent features 182. A reflector 187 similar to reflector 32 is also provided.

A simple fabrication method for the signage display 180 is as follows. The photoluminescent features 182, formed of material having a refractive index of 1.3, is screen print patterned onto the waveguide 184 of refractive index of 1.5. The photoluminescent features 182 may be slightly diffuse, have a slightly textured surface, or have lensed or other geometrical shapes which promote improved light outcoupling. The resin matrix for screen printing the photoluminescent features 182 may contain a strong solvent that partially dissolves the upper surface of the underlying waveguide 184. Given the lower refractive index of 1.3 the photoluminescent feature 182, the coupling of light from the waveguide 184 to the photoluminescent layer is primarily via frustrated internal reflection and absorption by the fluorescent medium in the photoluminescent feature 182.

The waveguide 184, photoluminescent features 182, and other adjacent layers (not shown) can also be formed as a flexible film or sheet that is laminated and therefore optically coupled onto a second waveguide (not shown) which first receives the short wavelength light. Furthermore, the short wavelength light source can be optically coupled into a third waveguide (not shown) which is then laminated and optically coupled to any of the above mentioned waveguides. A practical example of this form of signage is a window pane, which can be transformed into a LWC signage display by simply laminating a short wavelength light source and associated waveguide, and laminating the appropriate graphics to the window in the form of a flexible waveguide carrying the photoluminescent features and other optical layers.

The invention will be further appreciated in light of the following examples.

EXAMPLE 1

A polymer binder (Ferro 75001 polyvinylbutyrolterpolymer PVB, binder) was mixed with about 1 percent to about 10 percent by volume solution of acetone and the maximum soluble concentration of BASF Lumogen 300 and BASF Lumogen 083 fluoropolymers to form a photoluminescent resin. The photoluminescent resin was doctor blade applied to a glass substrate and baked at 150° C. for 10 minutes to volatilize all solvents in order to form a solid gel layer. The photoluminescent layer was then bonded to DuPont Kapton tape film and pulled from the glass substrate it was formed on to create a usable film flexible film. The resulting photoluminescent film was placed on an acrylic waveguide propagating blue/violet light from a cold-cathode-fluorescent-lamp.

In regions where pressure was applied onto the photoluminescent layer onto the substrate, the photoluminescent layer brightly fluoresced. The photoluminescent layer was further pressed against the glass in several regions, optically coupling the photoluminescent film to the acrylic waveguide, causing propagating violet/blue light to couple into the photoluminescent film and thereby causing visible fluorescence.

EXAMPLE 2

BASF Lumogen dyes were dissolved at maximum solubility in Acetone. BASF dye Lumogen 570 was used for blue emission, Lumogen 083 for green emission, and Lumogen 300 for red emission. This mixture was then added to and dissolved in acrylic beads in an airtight container. Once the mixture was completely dissolved, a non-volatile thinner of DuPont 8250 was added, mixed, and the acetone allowed to volatize over a period of 12 hours. This photoluminescent resin was then screen-printed onto an acrylic waveguide and baked at 120° C. for 15 minutes to remove the DuPont 8250, forming a hard and transparent photoluminescent layer. The waveguide was then mirrored using an Al adhesive tape and InGaN LEDs attached through apertures in the tape.

This signage form of an LWC display exhibited the following performance:

| | |
|---|---|
| Waveguide Dimensions: | about 2" × 4", about 2 mm thickness |
| Pump Specifications: | 10 InGaN violet LEDs, 20 mA each |
| Power requirement: | 3.5 V, 200 mA, 0.7 W |
| Luminance: | red 170 cd/m$^2$ |
| | green 440 cd/m$^2$ |
| | blue 70 cd/m$^2$ |
| Appearance: | Transparent |
| Color Gamut: | Satisfies EBU Gamut |

EXAMPLE 3

This photoluminescent resins of Example 2 were screen-printed onto a first acrylic waveguide and baked at 120° C. for 15 minutes to form a hard photoluminescent layer. A second waveguide was then mirrored using an Al adhesive tape and InGaN LEDs attached through apertures in the tape. An silicone oil drop was placed at several regions between the first waveguide and second waveguide, the waveguides then sandwiched together, in order to measure the effective device contrast ratio achievable using electro-static or electrowetting based modulation in an LWC device.

| | | | |
|---|---|---|---|
| Waveguide Dimensions: | about 2" × 4", about 2 mm thickness | | |
| Pump Specifications: | 4 InGaN violet LEDs, 10 mA each | | |
| Power requirement: | 3.5 V, 40 mA, 0.14 W | | |
| | Non Coupled | Coupled | Contrast Ratio |
| red | 0.1 cd/m$^2$ | 50 cd/m$^2$ | 500:1 |
| green | 0.3 cd/m$^2$ | 105 cd/m$^2$ | 300:1 |
| blue | 0.15 cd/m$^2$ | 35 cd/m$^2$ | 200:1 |
| Waveguide Luminance: | violet 0.1 cd/m$^2$ (at imperfections) | | |
| Appearance: | Transparent | | |

An interesting comparison may be made to prior art. First, for the same optical power density in the waveguide, prior art using a white light waveguide or storage plate would exhibit an approximate luminance of 15–30 cd/m$^2$ due to the strong response of the human eye to white light. This has the effect of reducing the effective contrast in prior art to unacceptable levels of less than 10:1. If a coupler is provided, the above-measured contrast ratio for LWC devices increases by a factor of 10 to 100 by limiting the coupling area between the waveguide and photoluminescent layer to 10 percent to 1 percent of the total LWC device area. This has the effect of increasing the expected contrast of LWC devices and displays to greater than 1,000:1, with 10,000's contrast ratio certainly theoretically achievable.

EXAMPLE 4

Electrowetting LWC device operation was verified in the following manner. 50 nm thick ITO column electrodes were sputter deposited onto a first sheet of Corning 1737 glass. Similarly a 50 nm thick sheet of ITO was sputter deposited onto a second sheet of Corning 1737 glass. About 500 nm of $SiO_2$ dielectric was then further sputter deposited onto the first glass substrate. DuPont TEFLON® AF dissolved in 3M Fluorinert liquid was spin coated onto both glass sheets and baked to a final thickness of about 100 nm. Approximately 1 µL electrolytic water drops (containing KCl) were placed on the first glass glass sheet. Silicone oil doped with BASF Lumogen dyes where then uniformly coated to the second glass sheet. The two sheets were then laminated together with 0.2 mm spacers. The second sheet ITO was grounded and the sheet was edge pumped with a 400 nm LED. The second sheet acted as a waveguide and caused the adjacent oil to fluoresce. The first sheet ITO column electrodes were selectively biased with 40 V, which caused the water droplets to attract to the biased electrodes via electrowetting. The attraction of the water droplet displaced the fluorescent oil effectively 'turning off' the emission in the biased columns. Conversely, columns could be 'turned on' by biasing adjacent columns which attracted away the water droplet, and allowed the oil to rewet the surface of the second sheet and fluoresce.

EXAMPLE 5

Electrostatic LWC devices may be fabricated in the following manner. A Corning 1737 glass substrate of 1.1 mm thickness is used as a fabrication substrate and waveguide. The substrate is then deposited with about 1.5 µm of $MgF_2$ using sputtering, evaporation, or chemical vapor deposition. The $MgF_2$ is patterned on the upper surface of the waveguide using a standard photolithography. The index of refraction of the substrate is 1.54, which results in a critical angle of 65.4° for internal reflection at the substrate/$MgF_2$ interface. Active matrix thin-film poly-Si transistors are deposited onto the patterned $MgF_2$ cladding using plasma-enhanced CVD techniques well known by those skilled in the art. Two (2) µm thick high poly-Si spacers are also deposited on the patterned $MgF_2$ cladding during the poly-Si deposition process. Al lower electrostatic electrodes of 0.1 µm thickness are also sputter deposited onto the $MgF_2$ cladding. A thin organic release layer such as Brewer Science PIRL III is then deposited.

An about 2 µm thick SiON optical coupler with refractive matched to the substrate is also deposited by sputtering and patterned such that it is aligned with the apertures in the cladding. A second organic release layer is deposited onto the substrate using aqueous techniques known by those skilled in the art. The second release layer is patterned such that it does not cover the upper surface of the poly-Si spacers or the SiON coupler. A SiON flexible membrane, which is about 2 µm thick, is then deposited using sputtering. About 0.02 µm thin $In_2O_3$:$SnO_2$ (ITO) upper electrostatic electrode is deposited and patterned onto the upper surface of the SiON flexible membrane. About 10 µm thick photoluminescent layer comprised of PMMA polymer doped with BASF Lumogen fluorescent dye, and containing BaS powder as a slight diffusing material, is then wet deposited and patterned onto the upper electrostatic electrode. Al row, column, power, and ground electrodes of about 0.2 µm thick are deposited, connected to the underlying active matrix circuitry. The electrodes are insulated from each other by a about 1 µm thick silicon dioxide layer. The release layers are then dissolved away leaving a freely standing electrostatic actuation and lightwave coupling structure.

A standard front color filter plate is then aligned and bonded to the lower waveguide/substrate plate. The color filter plate is distanced from the waveguide substrate and adjoining layers by black polymer spacers patterned between the color filters and aligned with the outside edges of each LWC pixel. The substrate/color filter plate is sealed at the edges using a UV curing epoxy, vacuum evacuated, then filled with Argon gas to a pressure of 100 Torr. Alternatively the environment between the plates may be filled with a low viscosity (~1 cts) low index (~1.3) fluid.

Mirrored structures are attached and optically bonded to all four edges of the waveguide plate. The mirrored structures consist of multilayer dielectric/metal reflectors well known by those skilled in the art such that greater than 99 percent of incident light 400 nm visible light is reflected. Lensed and horizontally emitting violet LED's are then inserted into vertical holes drilled near the edges of the waveguide. The LED's emit within a horizontal degree of 20 degrees, which results in a maximum angle of incidence in the waveguide of 77 degrees, which is more than 10 degrees within the critical angle requirement. The rear surface of the display is then painted with black paint onto the rear $MgF_2$ cladding. The paint acts as a light absorbing layer to decrease ambient reflection. A circular polarizing filter is then laminated onto the front of the color-filter plate. The rear of the display is then properly enclosed and packaged, including required driver circuitry, electrical connections, and mounting fixtures for the LWC flat panel display. Assuming use of InGaN LEDs producing a phosphor converted white efficiency of 80 lm/W, the peak theoretical efficiency of the display described here is greater than 40 lm/W. A reasonable luminance level for the display of 50 to 5000 cd/m² is expected due to the high luminous efficiency. The display inherently exhibits a specular reflection of 2 percent and a diffuse reflection of 1 percent allowing sunlight legibility.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A lightwave coupling device comprising:
   a waveguide capable of propagating light of a first wavelength through internal reflection;
   a photoluminescent medium positioned proximate to said waveguide, said photoluminescent medium capable of being selectively optically coupled to said waveguide for receiving light of said first wavelength and emitting light of a second wavelength in response to receiving light of said first wavelength;
an electrowetting medium positioned between said waveguide and said photoluminescent medium;
first and second electrodes; and
a voltage source electrically coupled with said first and second electrodes, said voltage source capable of applying an actuation voltage to said first and second electrodes effective to move said electrowetting medium between a first condition that permits transfer light of said first wavelength from said optical waveguide to said photoluminescent medium and a second condition in which light of said first wavelength remains confined in said waveguide.

2. The lightwave coupling device of claim 1 further comprising:
a cladding layer disposed on said waveguide, said cladding layer having a lower refractive index than said waveguide.

3. The lightwave coupling device of claim 2 wherein said cladding layer is disposed between said waveguide and said photoluminescent medium, said cladding layer including an aperture to permit transfer of light of said first wavelength from said optical waveguide to said photoluminescent medium.

4. The lightwave coupling device of claim 1 wherein said waveguide includes a region between said waveguide and said photoluminescent medium effective to reflect said light of said first wavelength back into said waveguide.

5. The lightwave coupling device of claim 1 further comprising:
a third electrode electrically connected to said voltage source, said third electrode participating in the movement of said electrowetting medium by receiving voltage from said voltage source.

6. The lightwave coupling device of claim 1 further comprising:
a flexible supporting layer movable in response to said actuation voltage applied to said first and second electrodes, said flexible supporting member moving said electrowetting medium to provide said first and second conditions.

7. A lightwave coupling device comprising:
a waveguide capable of propagating light of a first wavelength through internal reflection; first and second electrodes;
an electrowetting medium positioned between said first and second electrodes, said electrowetting medium capable of being selectively optically coupled to said waveguide for receiving light of said first wavelength and emitting light of a second wavelength in response to receiving light of said first wavelength; and
a voltage source electrically coupled with said first and second electrodes, said voltage source capable of applying an actuation voltage to said first and second electrodes effective to move said electrowetting medium between a first condition that permits transfer light of said first wavelength from said optical waveguide to said electrowetting medium and a second condition in which light of said first wavelength remains confined in said waveguide.

8. The lightwave coupling device of claim 7 further comprising:
a cladding layer disposed on said waveguide, said cladding layer having a lower refractive index than said waveguide.

9. The lightwave coupling device of claim 7 wherein said cladding layer is disposed between said waveguide and said electrowetting medium, said cladding layer including an aperture to permit transfer of light of said first wavelength from said optical waveguide to said electrowetting medium.

10. The lightwave coupling device of claim 7 wherein said waveguide includes a region between said waveguide and said electrowetting medium effective to reflect said light of said first wavelength back into said waveguide.

11. The lightwave coupling device of claim 7 further comprising:
a third electrode electrically connected to said voltage source, said third electrode participating in the movement of said electrowetting medium by receiving voltage from said voltage source.

12. The lightwave coupling device of claim 7 further comprising:
a flexible supporting layer movable in response to said actuation voltage applied to said first and second electrodes, said flexible supporting member moving said electrowetting medium to provide said first and second conditions.

* * * * *

UNITED STATES PATENT AND TRADEMARK OFFICE
CERTIFICATE OF CORRECTION

PATENT NO. : 7,123,796 B2
APPLICATION NO. : 10/730332
DATED : October 17, 2006
INVENTOR(S) : Steckl et al.

It is certified that error appears in the above-identified patent and that said Letters Patent is hereby corrected as shown below:

Column 2, page 2, change "microfuidics" to --microfluidics--.

Column 3:
Line 11, before "lightwave" delete "modulated".
Line 52, change "have refractive indices" to --has a refractive index--.

Column 4:
Line 59, after "limited" delete ",".
Line 59, after "to" insert --,--.

Column 6:
Line 18, change "commons" to --common--.
Line 28, change "commons" to --common--.
Line 29, change "butryal" to --butyral--.

Column 7, line 41, change "complimentary" to --complementary--.

Column 9, line 3, after "appropriate" delete "with".

Column 10:
Line 10, change "refection" to --reflection--.
Line 30, change "sources" to --source--.

Column 11, line 45, change "on" to --one--.

Column 12:
Line 48, change "have" to --has--.
Line 64, change "spacer" to --spacers--.

Column 13, line 57, after "with" delete "an".

Column 14:
Line 2, after "pixels" delete "on".
Line 57, after "limited" delete ",".
Line 57, after "to" insert --,--.
Line 64, before "positioned" insert --be--.

Column 16, line 16, change "with" to --which--.

UNITED STATES PATENT AND TRADEMARK OFFICE
CERTIFICATE OF CORRECTION

PATENT NO. : 7,123,796 B2
APPLICATION NO. : 10/730332
DATED : October 17, 2006
INVENTOR(S) : Steckl et al.

It is certified that error appears in the above-identified patent and that said Letters Patent is hereby corrected as shown below:

Column 17, line 19, after "from" delete "of".

Column 18, line 54, change "by" to --but--.

Column 20, line 42, before "controlled" insert --is--.

Column 21:
Line 27, before "binary" delete "not".
Line 37, change "acts" to --act as--.
Line 38, after "according" insert --to--.
Line 50, change "is" to --are--.
Line 55, after "area" insert --of--.

Column 22:
Line 12, change "indicted" to --indicated--.
Line 67, after "may" insert --be--.
Line 67, change "affect" to --effect--.

Column 23, line 10, change "non selected" to --non-selected--.

Column 25:
Line 15, change "is" to --are--.
Line 59, after "usable" delete "film".
Line 64, change "onto" to --on--.

Column 26:
Line 36, change "This" to --The--.
Line 52, change "Non Coupled" to --Non-Coupled--.

Column 27:
Line 20, after "first" delete "glass".
Line 21, change "where" to --was--.
Line 56, after "refractive" insert --index--.

Claim 1, column 29, line 11, before "light" insert --of--.

UNITED STATES PATENT AND TRADEMARK OFFICE
CERTIFICATE OF CORRECTION

PATENT NO. : 7,123,796 B2
APPLICATION NO. : 10/730332
DATED : October 17, 2006
INVENTOR(S) : Steckl et al.

It is certified that error appears in the above-identified patent and that said Letters Patent is hereby corrected as shown below:

Claim 7, column 30, line 12, before "light" insert --of--.

Signed and Sealed this

Twenty-ninth Day of May, 2007

JON W. DUDAS
*Director of the United States Patent and Trademark Office*